United States Patent
Kinnebrew et al.

(10) Patent No.: US 9,645,394 B2
(45) Date of Patent: May 9, 2017

(54) CONFIGURED VIRTUAL ENVIRONMENTS

(75) Inventors: Peter Tobias Kinnebrew, Seattle, WA (US); Nicholas Feriane Kamuda, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 77 days.

(21) Appl. No.: 13/532,668

(22) Filed: Jun. 25, 2012

(65) Prior Publication Data

US 2013/0342564 A1    Dec. 26, 2013

(51) Int. Cl.
| | |
|---|---|
| *G06T 15/00* | (2011.01) |
| *G02B 27/01* | (2006.01) |
| *G09G 3/00* | (2006.01) |
| *G06T 19/00* | (2011.01) |
| *G06F 3/01* | (2006.01) |
| *G06F 3/14* | (2006.01) |

(52) U.S. Cl.
CPC ............ *G02B 27/017* (2013.01); *G06F 3/011* (2013.01); *G06T 19/006* (2013.01); *G09G 3/003* (2013.01); *G02B 2027/014* (2013.01); *G02B 2027/0178* (2013.01); *G06F 3/14* (2013.01); *G09G 2360/04* (2013.01); *G09G 2360/06* (2013.01); *G09G 2360/121* (2013.01); *G09G 2370/022* (2013.01); *G09G 2370/16* (2013.01)

(58) Field of Classification Search
None
See application file for complete search history.

(56) References Cited

U.S. PATENT DOCUMENTS

| | | | | |
|---|---|---|---|---|
| 8,839,121 | B2 * | 9/2014 | Bertolami et al. | 715/757 |
| 9,007,473 | B1 * | 4/2015 | Worley et al. | 348/211.11 |
| 2005/0251030 | A1 * | 11/2005 | Azar | A61B 90/36 |
| | | | | 600/429 |
| 2008/0071559 | A1 * | 3/2008 | Arrasvuori | 705/1 |
| 2009/0005140 | A1 * | 1/2009 | Rose et al. | 463/7 |
| 2009/0066690 | A1 * | 3/2009 | Harrison | G06T 19/006 |
| | | | | 345/419 |
| 2009/0307623 | A1 * | 12/2009 | Agarawala | G06F 3/0483 |
| | | | | 715/765 |
| 2010/0030578 | A1 * | 2/2010 | Siddique et al. | 705/3 |
| 2010/0058207 | A1 * | 3/2010 | Hamey et al. | 715/763 |
| 2010/0103196 | A1 | 4/2010 | Kumar et al. | |

(Continued)

OTHER PUBLICATIONS

Lee, et al., "Layer-based Media Integration for Mobile Mixed-Reality Applications", In Proceedings of Third International Conference on Next Generation Mobile Applications, Services and Technologies, Sep. 15, 2009, pp. 58-63.

(Continued)

*Primary Examiner* — Andrew G Yang
(74) *Attorney, Agent, or Firm* — Vierra Magen Marcus LLP

(57) ABSTRACT

A display apparatus and method for creating and displaying configured virtual environments based on real world source environments. A mixed reality environment includes real and virtual objects, and a set of one or more virtual objects may be associated with a source environment and stored as a configured environment for later rendering by the display apparatus. Configured environments may be associated with users, environments or locations.

20 Claims, 19 Drawing Sheets

(56) References Cited

U.S. PATENT DOCUMENTS

| | | | |
|---|---|---|---|
| 2010/0208033 A1 | 8/2010 | Edge et al. | |
| 2010/0325154 A1* | 12/2010 | Schloter et al. | 707/770 |
| 2012/0075484 A1* | 3/2012 | Kawamoto | G06T 19/006 348/207.1 |
| 2013/0038510 A1 | 2/2013 | Brin et al. | |
| 2013/0044042 A1 | 2/2013 | Olsson et al. | |
| 2013/0050069 A1* | 2/2013 | Ota | 345/156 |
| 2013/0065692 A1* | 3/2013 | Aronzon et al. | 463/42 |
| 2013/0106910 A1* | 5/2013 | Sacco | 345/633 |

OTHER PUBLICATIONS

Tarumi, et al., "Communication through Virtual Active Objects Overlaid onto the Real World", In Proceedings of the Third International Conference on Collaborative Virtual Environments, Sep. 2000, pp. 155-164.

Billinghurst, et al., "Collaborative Mixed Reality", In Proceedings of the First International Symposium on Mixed Reality, Mar. 9, 1999, pp. 261-284.

Kim, et al., "Data Markup Representation for Mixed Reality Contents", In Proceedings of International AR Standards Meeting, Feb. 19, 2011, 8 pages.

Izadi, et al., "A Citywide Mixed Reality Performance: Initial Findings", In Proceedings of the Workshop on Moving between the Physical and the Digital, Apr. 2001, pp. 15-17.

Schnadelbach, et al., "The Augurscope: A Mixed Reality Interface for Outdoors", In Proceedings of the SIGCHI Conference on Human Factors in Computing Systems: Changing our World, Changing Ourselves, Apr. 20, 2002, pp. 9-16.

\* cited by examiner

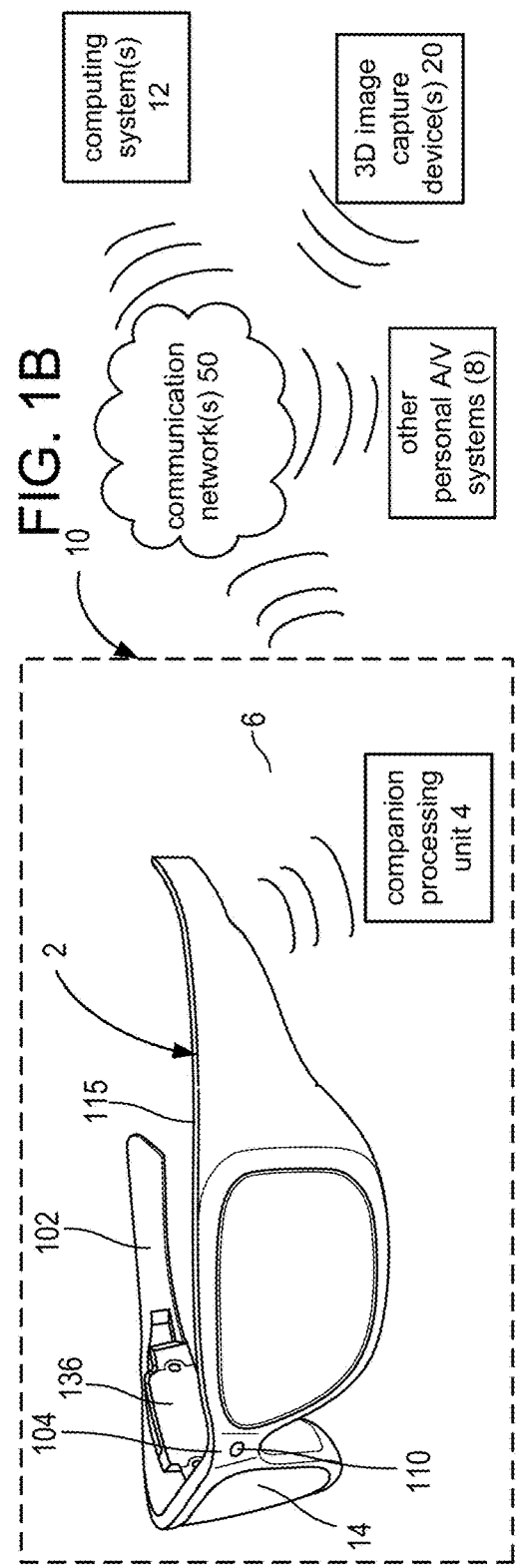

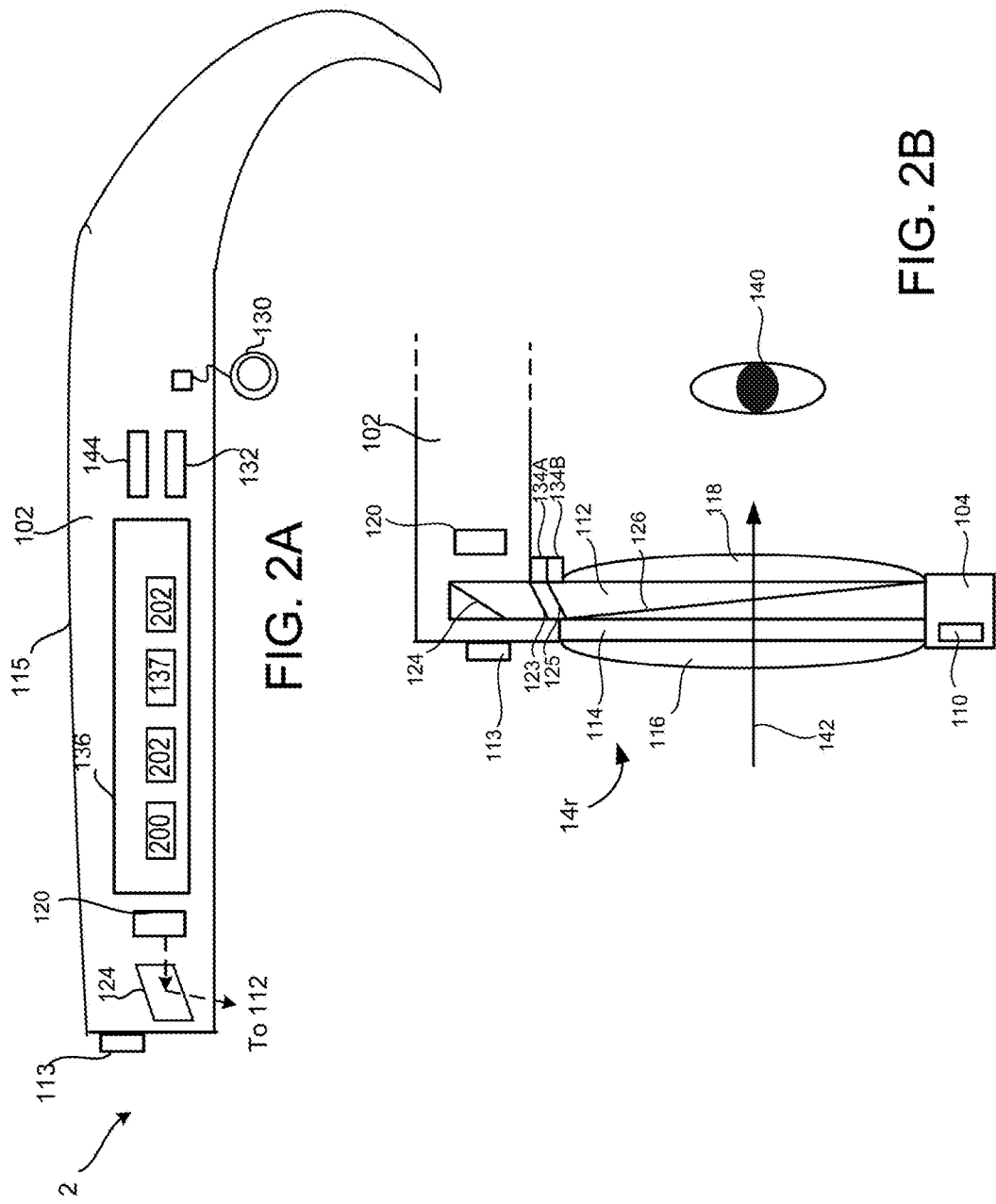

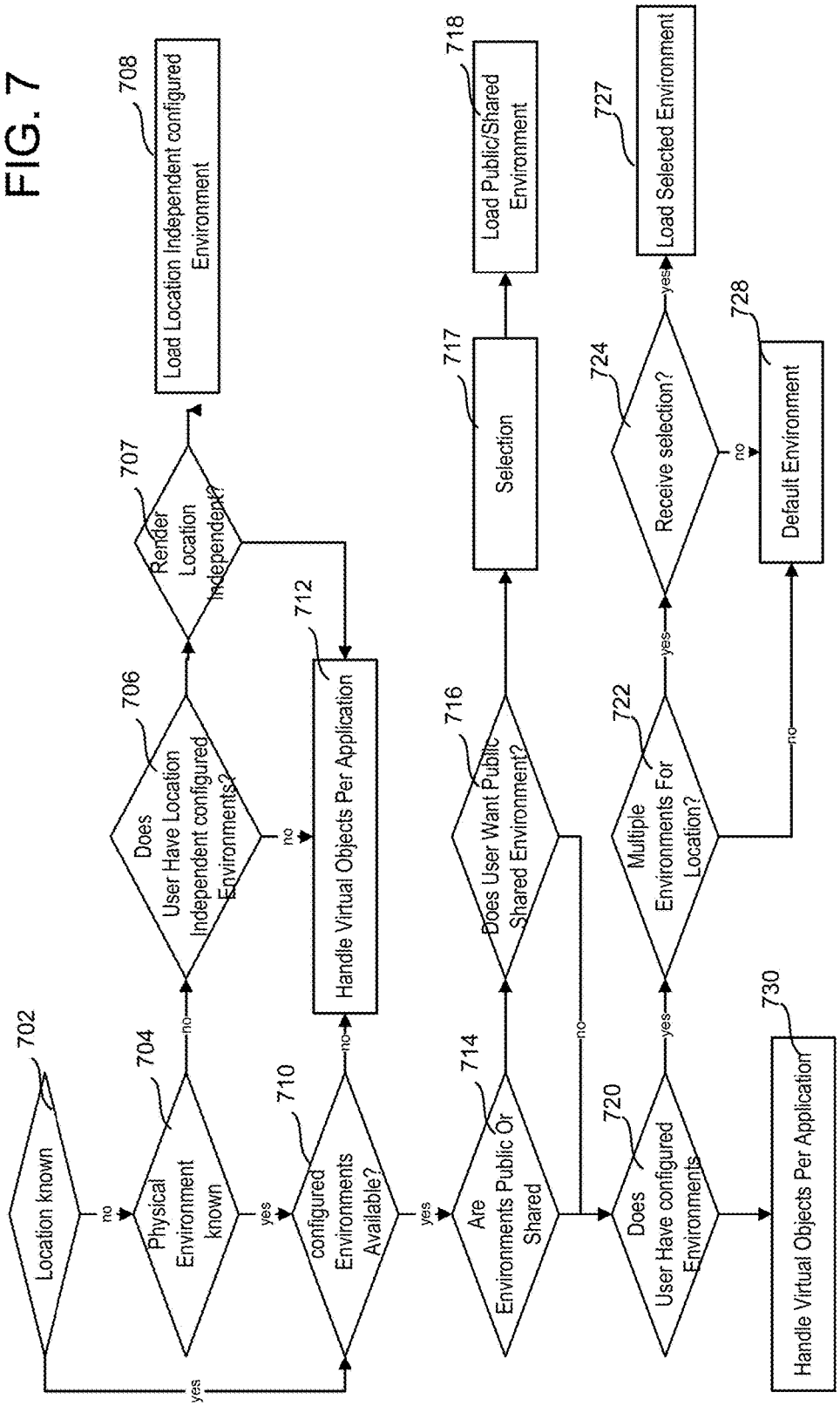

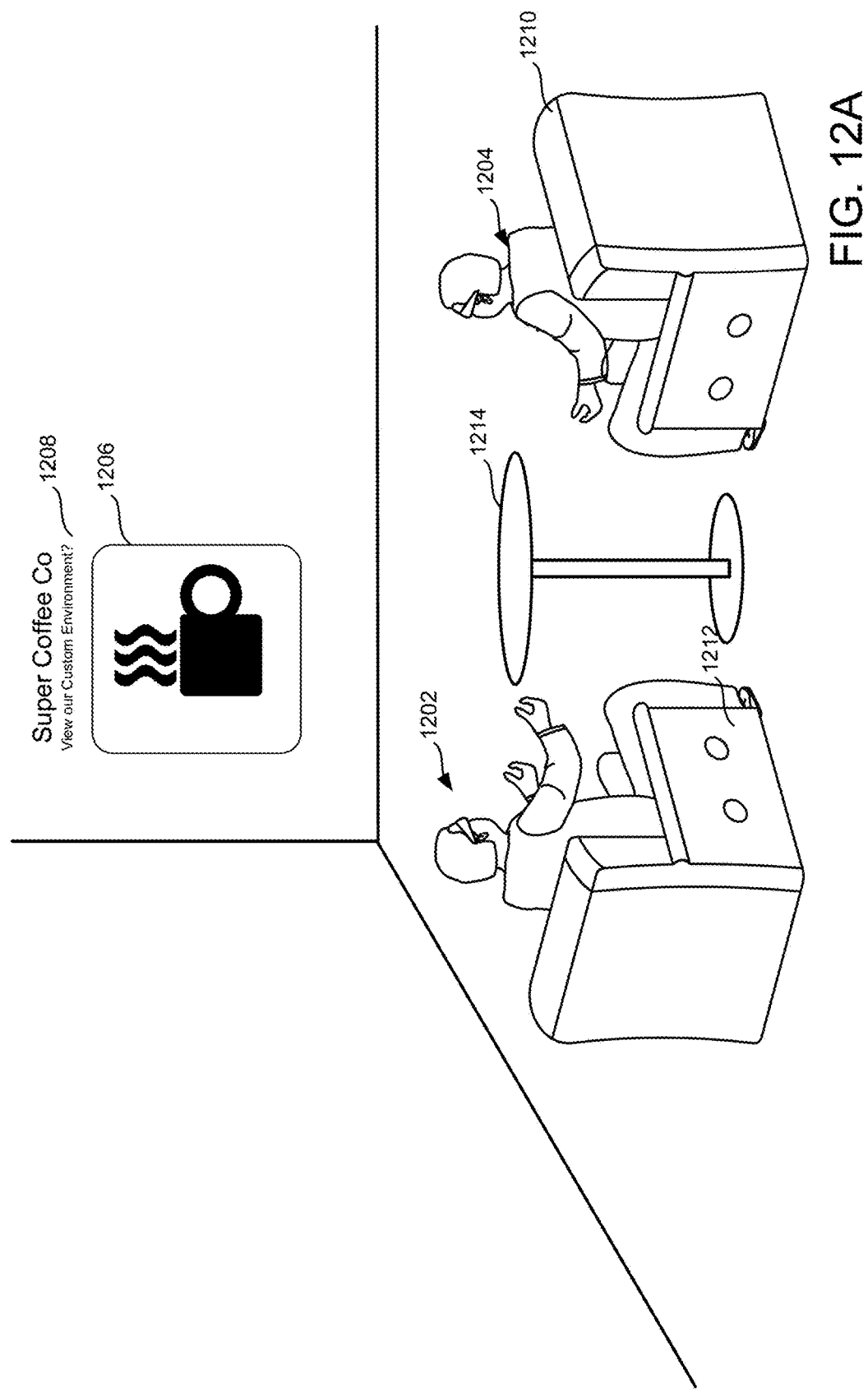

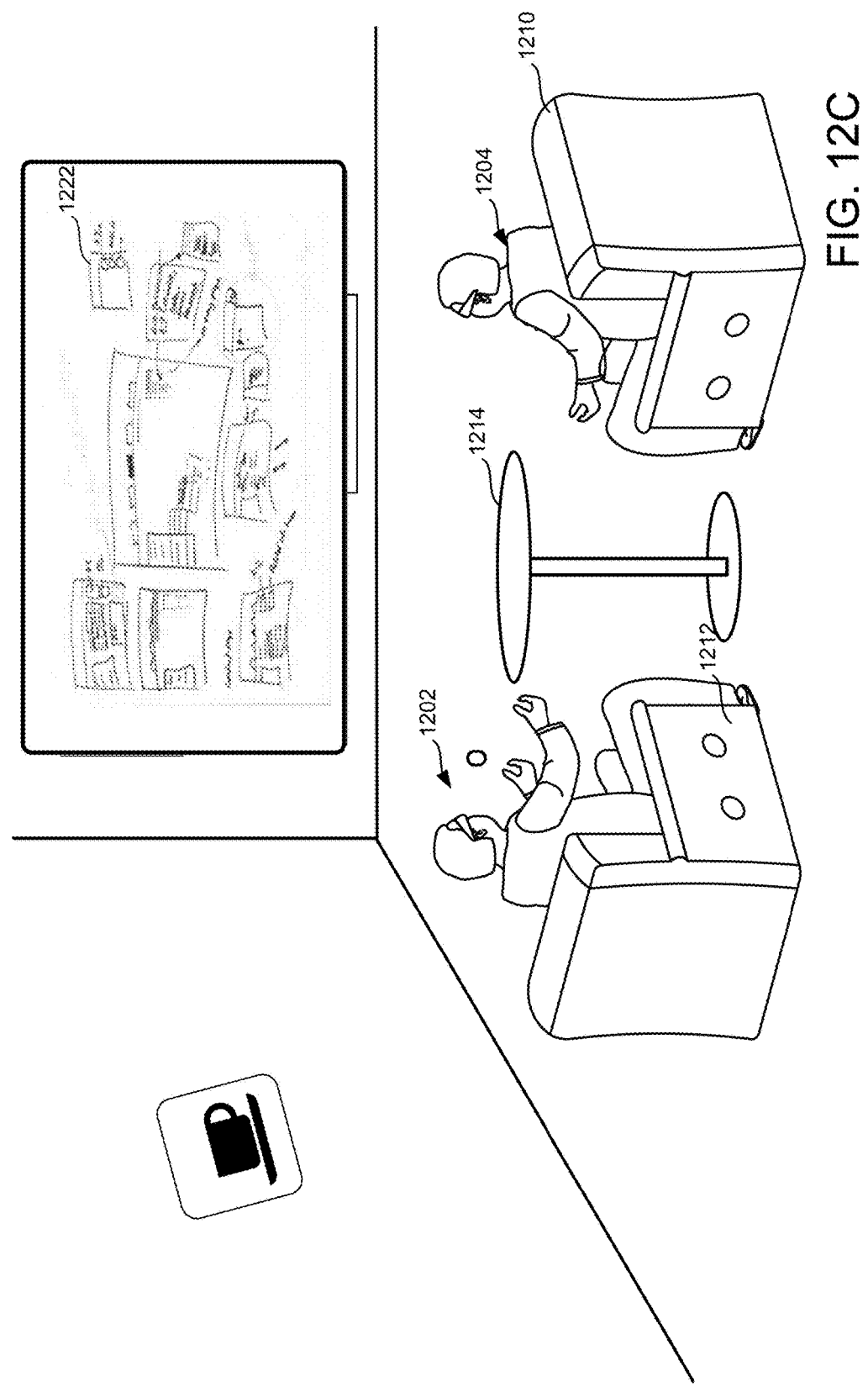

CONFIGURED VIRTUAL ENVIRONMENTS

BACKGROUND

Augmented reality is a technology that allows virtual imagery to be presented to a user. Some augmented reality systems superimpose virtual images on real world imagery in real time through, for example, taking input from a camera and outputting the image and projecting a virtual image on the real world image. Products using near eye displays have been used to project imagery near to a user's eyes an present media thought-out a user's field of view.

SUMMARY

Technology is described herein which provides various embodiments for implementing a configured virtual environment comprising a set of virtual objects defined with respect to a source physical environment. The configured environments may be rendered in a head mounted display system which may comprise a see through head mounted display system. Each configured environment may be selected by a user and loaded for rendering to the user in the display system. Configured environments based on a source environment may be rendered for a user in the source environment or in a different rendering environment. Configured environments may be associated with users, environments or locations. This association allows control over the rendering of configured environments to users as virtual objects may comprise manifestations of physical features of an environment.

Configured environments may be further manipulated by a user of a see through head mounted display and the changes to the environment saved for rendering later. Configured environments may be shared between respective wearers of a display systems, and/or provided by public or retail entities.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1B is a block diagram depicting example components of another embodiment of a see-through, mixed reality display device with adjustable IPD.

FIG. 2A is a side view of an eyeglass temple of a frame in an embodiment of see-through, near-eye, augmented reality display.

FIG. 2B is a top view of an embodiment of one side of a see-through, near-eye, augmented reality display including a display optical system 14.

FIG. 7 is a flowchart illustrating one embodiment for performing step 606 of FIG. 6.

FIGS. 12A-12C illustrate two users who may wish to share a virtual environment.

DETAILED DESCRIPTION

The technology described herein includes providing a see-through, near-eye, mixed reality display device with a set of configured virtual environments. Each configured virtual environment may include a set of virtual objects defined with respect to a source physical environment. The configured environments may be rendered in a head mounted display system which may comprise a see-through, near eye head mounted display system. Configured environments may be loaded for rendering in the display system and the manner of rendering may depend on the user rendering environment. Where a see through, mixed reality system is used and the user is in a rendering environment comprising a physical environment different than the source environment, the configured environment may be rendered relative to any real objects in the rendering environment or may obscure real objects in the rendering environment. Configured environments may be associated with users, environments or locations. This association allows control over the rendering of configured environments to users.

Configured environments may be further manipulated by a user of a see through head mounted display and the changes to the environment saved for rendering later. Configured environments may be shared between respective wearers of a display systems, and/or provided by public or retail entities.

Figure 1A:
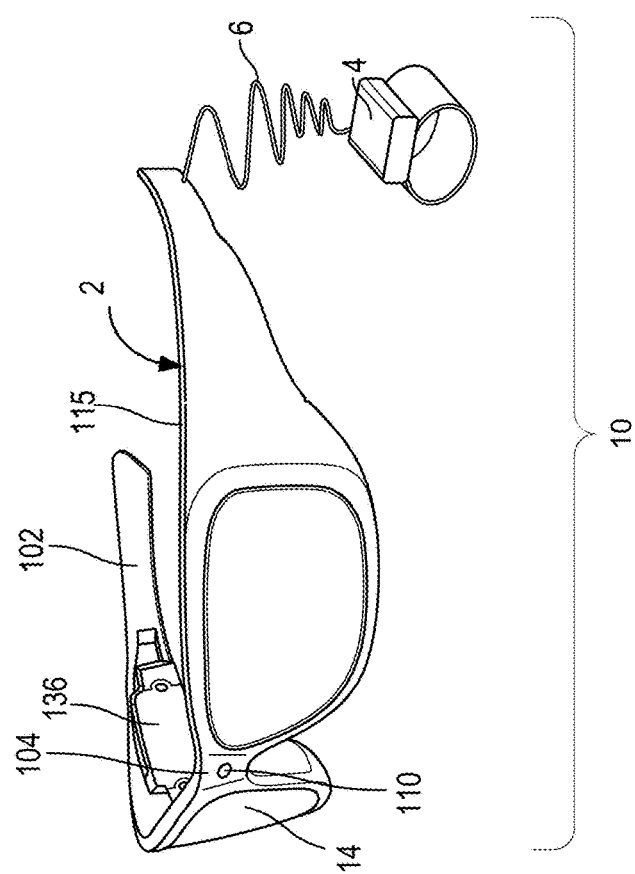
FIG. 1A is a block diagram depicting example components of one embodiment of a see-through, mixed reality display device with adjustable IPD in a system environment in which the device may operate.

FIG. 1A is a block diagram depicting example components of one embodiment of a see-through, mixed reality display device in a system environment in which the device may operate. In one embodiment, the technology implements a see through, near-eye display device. In other embodiments, see through display devices of different types may be used. System 10 includes a see-through display device as a near-eye, head mounted display device 2 in communication with processing unit 4 via wire 6. In other embodiments, head mounted display device 2 communicates with processing unit 4 via wireless communication. Processing unit 4 may take various embodiments. In some embodiments, processing unit 4 is a separate unit which may be worn on the user's body, e.g. the wrist in the illustrated example or in a pocket, and includes much of the computing power used to operate near-eye display device 2. Processing unit 4 may communicate wirelessly (e.g., WiFi, Bluetooth, infra-red, or other wireless communication means) to one or more computing systems, hot spots, cellular data networks, etc. In other embodiments, the functionality of the processing unit 4 may be integrated in software and hardware components of the display device 2.

See through head mounted display device 2, which in one embodiment is in the shape of eyeglasses in a frame 115, is worn on the head of a user so that the user can see through a display, embodied in this example as a display optical system 14 for each eye, and thereby have an actual direct view of the space in front of the user. The use of the term "actual direct view" refers to the ability to see real world objects directly with the human eye, rather than seeing created image representations of the objects. For example, looking through glass at a room allows a user to have an actual direct view of the room, while viewing a video of a room on a television is not an actual direct view of the room. Based on the context of executing software, for example, a gaming application, the system can project images of virtual objects, sometimes referred to as virtual images or holograms, on the display that are viewable by the person wearing the see-through display device while that person is also viewing real world objects through the display.

Frame 115 provides a support for holding elements of the system in place as well as a conduit for electrical connections. In this embodiment, frame 115 provides a convenient eyeglass frame as support for the elements of the system discussed further below. In other embodiments, other support structures can be used. An example of such a structure is a visor, hat, helmet or goggles. The frame 115 includes a temple or side arm for resting on each of a user's ears. Temple 102 is representative of an embodiment of the right temple and includes control circuitry 136 for the display device 2. Nose bridge 104 of the frame includes a microphone 110 for recording sounds and transmitting audio data to processing unit 4.

FIG. 1B is a block diagram depicting example components of another embodiment of a see-through, mixed reality display device. In some embodiments, processing unit 4 is a separate unit which may be worn on the user's body, e.g. a wrist, or be a separate device like a mobile device (e.g. smartphone). The processing unit 4 may communicate wired or wirelessly (e.g., WiFi, Bluetooth, infrared, RFID transmission, wireless Universal Serial Bus (USB), cellular, 3G, 4G or other wireless communication means) over a communication network 50 to one or more computing systems 12 whether located nearby or at a remote location. In other embodiments, the functionality of the processing unit 4 may be integrated in software and hardware components of the display device 2.

Figure 14:
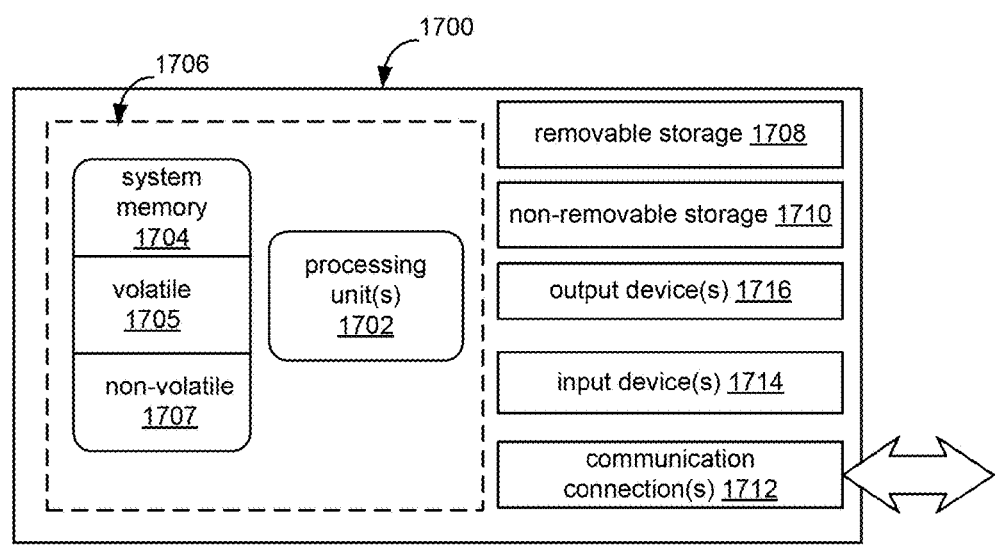
FIG. 14 is a block diagram of another exemplary processing device.

One or more remote, network accessible computer system(s) 12 may be leveraged for processing power and remote data access. An example of hardware components of a computing system 12 is shown in FIG. 14. An application may be executing on computing system 12 which interacts with or performs processing for an application executing on one or more processors in the see-through, augmented reality display system 10. For example, a 3D mapping application may be executing on the one or more computer systems 12 and the user's display system 10.

Additionally, in some embodiments, the applications executing on other see through head mounted display systems 10 in same environment or in communication with each other share data updates in real time, for example object identifications and occlusion data like an occlusion volume for a real object, in a peer-to-peer configuration between devices or to object management service executing in one or more network accessible computing systems.

The shared data in some examples may be referenced with respect to one or more referenced coordinate systems accessible to the device 2. In other examples, one head mounted display (HMD) device may receive data from another HMD device including image data or data derived from image data, position data for the sending HMD, e.g. GPS or IR data giving a relative position, and orientation data. An example of data shared between the HMDs is depth map data including image data and depth data captured by its front facing capture devices 113, object identification data, and occlusion volumes for real objects in the depth map. The real objects may still be unidentified or have been recognized by software executing on the HMD device or a supporting computer system, e.g. 12 or another display system 10.

An example of an environment is a 360 degree visible portion of a real location in which the user is situated. A user may be looking at a subset of his environment which is his field of view. For example, a room is an environment. A person may be in a house and be in the kitchen looking at the top shelf of the refrigerator. The top shelf of the refrigerator is within his display field of view, the kitchen is his environment, but his upstairs bedroom is not part of his current environment as walls and a ceiling block his view of the upstairs bedroom. Of course, as he moves, his environment changes. Some other examples of an environment may be a ball field, a street location, a section of a store, a customer section of a coffee shop and the like. A location can include multiple environments, for example, the house may be a location. The user and his friends may be wearing their display device systems for playing a game which takes place throughout the house. As each player moves about the house, his environment changes. Similarly, a perimeter around several blocks may be a location and different intersections provide different environments to view as different cross streets come into view. In some instances, a location can also be an environment depending on the precision of location tracking sensors or data.

As illustrated in FIGS. 2A and 2B, an image generation unit 120 is included on each temple 102 in this embodiment as well. Also, illustrated in FIGS. 2A and 2B are outward facing capture devices 113, e.g. cameras, for recording digital image data such as still images, videos or both, and transmitting the visual recordings to the control circuitry 136 which may in turn send the captured image data to the companion processing unit 4 which may also send the data to one or more computer systems 12 or to another personal A/V apparatus over one or more communication networks 50.

Figure 13:
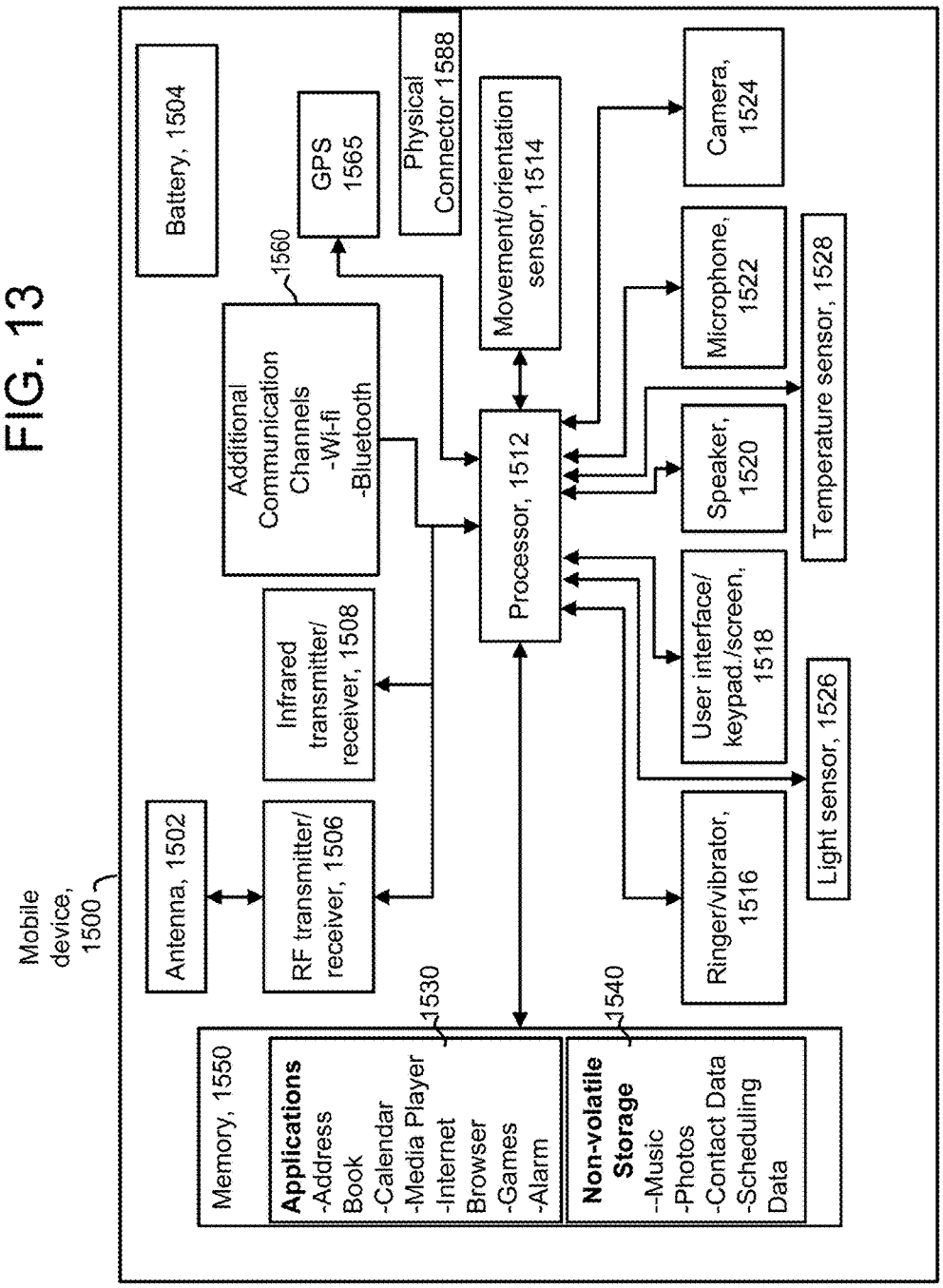
FIG. 13 is a block diagram of an exemplary processing device.

The processing unit 4 may take various embodiments. In some embodiments, companion processing unit 4 is a separate unit which may be worn on the user's body, e.g. a wrist, or be a separate device like a mobile device (e.g. smartphone). The companion processing unit 4 may communicate wired or wirelessly (e.g., WiFi, Bluetooth, infrared, an infrared personal area network, RFID transmission, wireless Universal Serial Bus (WUSB), cellular, 3G, 4G or other wireless communication means) over one or more communication networks 50 to one or more computing systems 12 whether located nearby or at a remote location, other personal A/V apparatus 5 in a location or environment, for example as part of peer-to-peer communication, and if available, one or more 3D image capture devices in the environment. In other embodiments, the functionality of the companion processing unit 4 may be integrated in software and hardware components of the display device 2 as in FIG. 1B. Some examples of hardware components of the companion processing unit 4 are shown in FIGS. 13 and 14.

One or more network accessible computer system(s) 12 may be leveraged for processing power and remote data access. An example of hardware components of a computing system 12 is shown in FIG. 14. An application may be executing on a computing system 12 which interacts with or performs processing for an application executing on one or more processors in the personal A/V apparatus 5. For example, a 3D mapping application may be executing on the one or more computers systems 12 and a user's personal A/V apparatus 5. In some embodiments, the application instances may perform in a master and client role in which a client copy is executing on the personal A/V apparatus 5 and performs 3D mapping of its display field of view, receives updates of the 3D mapping from the computer system(s) 12 including updates of objects in its view from the master 3D mapping application and sends image data, and depth and object identification data, if available, back to the master copy.

Additionally, in some embodiments, the 3D mapping application executing on different personal A/V apparatus 5 in the same environment share data updates in real time, for example object identifications and occlusion data like an occlusion volume for a real object in a peer-to-peer configuration between apparatus 5.

The shared data in some examples may be referenced with respect to a common coordinate system for the environment. In other examples, one head mounted display (HMD) system 10 may receive data from another HMD system 10 including image data or data derived from image data, position data for the sending HMD, e.g. GPS or IR data giving a relative position, and orientation data. An example of data shared between the HMDs is depth map data including image data and depth data captured by its front facing capture devices 113, object identification data, and occlusion volumes for real objects in the depth map. The real objects may still be unidentified or have been recognized by software executing on the HMD apparatus or a supporting computer system, e.g. 12 or another personal A/V apparatus 5. In a case of not using a common coordinate system, the second HMD can map the position of the objects in the received depth map for its user perspective based on the position and orientation data of the sending HMD. Any common objects identified in both the depth map data of a field of view of the recipient HMD device and the depth map data of a field of view of the sending HMD device may also be used for mapping.

An example of an environment is a 360 degree visible portion of a real location in which the user is situated. A user may only be looking at a subset of his environment which is his field of view. For example, a room is an environment. A person may be in a house and be in the kitchen looking at the top shelf of the refrigerator. The top shelf of the refrigerator is within his display field of view, the kitchen is his environment, but his upstairs bedroom is not part of his current environment as walls and a ceiling block his view of the upstairs bedroom. Of course, as he moves, his environment changes. Some other examples of an environment may be a ball field, a street location, a section of a store, a customer section of a coffee shop and the like. A location can include multiple environments, for example, the house may be a location. The user and his friends may be wearing their personal A/V apparatus for playing a game which takes place throughout the house. As each player moves about the house, his environment changes. Similarly, a perimeter around several blocks may be a location and different intersections provide different environments to view as different cross streets come into view. In some instances, a location can also be an environment depending on the precision of location tracking sensors or data.

In the illustrated embodiments of FIGS. 1A and 1B, the computer system(s) 12 and the personal A/V apparatus 5 may also have network access to 3D image capture devices 20. Capture devices 20 may be, for example, cameras that visually monitor one or more users and the surrounding space such that gestures and/or movements performed by the one or more users, as well as the structure of the surrounding space including surfaces and objects, may be captured, analyzed, and tracked. Such information may be used for example, to update display positions of virtual objects, displaying location based information to a user, and for identifying gestures to indicate one or more controls or actions for an executing application (e.g. game application).

FIG. 2A is a side view of an eyeglass temple of a frame in an embodiment of the personal audiovisual (A/V) apparatus having a see-through, augmented reality display embodied as eyeglasses providing support for hardware and software components. At the front of frame 115 is depicted one of at least two physical environment facing capture devices 113, e.g. cameras, that can capture video and still images, typically in color, of the real world to map real objects in the display field of view of the see-through display, and hence, in the field of view of the user.

In some examples, the capture devices 113 may also be depth sensitive, for example, they may be depth sensitive cameras which transmit and detect infrared light from which depth data may be determined. In other examples, a separate depth sensor (not shown) on the front of the frame 115 may also provide depth data to objects and other surfaces in the field of view. The depth data and image data form a depth map of the captured field of view of the capture devices 113 which are calibrated to include the display field of view. A three dimensional (3D) mapping of the display field of view can be generated based on the depth map. Some examples of depth sensing technologies that may be included on the head mounted display device 2 without limitation, are SONAR, LIDAR, Structured Light, and/or Time of Flight.

In some embodiments, stereopsis is used for determining depth information instead of or in addition to a depth sensor. The outward facing capture devices 113 provide overlapping image data from which depth information for objects in the image data may be determined based on stereopsis. Parallax and contrasting features such as color contrast may be used to resolve a relative position of one real object from another in the captured image data, for example for objects beyond a depth resolution of a depth sensor.

The capture devices 113 are also referred to as outward facing capture devices meaning facing outward from the user's head. The illustrated capture device 113 is a front facing capture device which is calibrated with respect to a reference point of its respective display optical system 14. One example of such a reference point is an optical axis (see axis 142 in FIG. 2B) of its respective display optical system 14. The calibration allows the field of view of the display optical systems 14, also referred to as the display field of view, to be determined from the data captured by the capture devices 113.

Control circuitry 136 provides various electronics that support the other components of head mounted display device 2. In this example, the right temple includes control circuitry 136 for the display device 2 which includes a processing unit or control circuit 200, including a memory (FIG. 3A) for storing processor readable instructions and data, a wireless interface 137 communicatively coupled to the control circuit 200, and a power management unit 202 providing power for the components of the control circuitry 136 and the other components of the display device 2 like the capture devices 113, the microphone 110 and the sensor units discussed below. The control circuit 200 may comprise one or more processors including a central processing unit (CPU) and a graphics processing unit (GPU), particularly in embodiments without a separate companion processing unit 4, which contains at least one graphics processing unit (GPU).

Inside, or mounted to temple 102, are an earphone 130 of a set of earphones 130, an inertial sensing unit including one or more inertial sensors 132, a location sensing unit including one or more location or proximity sensors 144, some examples of which are a GPS transceiver, an infrared (IR) transceiver, or a radio frequency transceiver for processing RFID data. In one embodiment, inertial sensor 132 includes a three axis magnetometer, a three axis gyro, and a three axis accelerometer as inertial sensors. The inertial sensors are for sensing position, orientation, and sudden accelerations of head mounted display device 2. From these movements, head position, and thus orientation of the display device, may also be determined. In this embodiment, each of the devices processing an analog signal in its operation include control circuitry which interfaces digitally with the control circuit 200 and memory and which produces or converts analog signals, or both produces and converts analog signals, for its respective device. Some examples of devices which process analog signals are the sensors 144, 132, and earphones 130 as well as the microphone 110, capture devices 113 and an IR illuminator source 134A, and an IR detector or sensor 134B discussed below, Mounted to or inside temple 102 is an image source or image generation unit 120 which produces visible light representing images. The image generation unit 120 can display a virtual object to appear at a designated depth location in a field of view to provide a realistic, in-focus three dimensional display of a virtual object which interacts with one or more real objects. Some examples of embodiments of image generation units 120 which can display virtual objects at various depths are described in the following applications which are hereby incorporated by reference: "Automatic Variable Virtual Focus for Augmented Reality Displays," having U.S. patent application Ser. No. 12/941,825 and inventors Avi Bar-Zeev and John Lewis, and which was filed Nov. 5, 2010 and "Automatic Focus Improvement for Augmented Reality Displays," having U.S. patent application Ser. No. 12/949,650 and inventors Avi Bar-Zeev and John Lewis, and which was filed Nov. 18, 2010. In these examples, a focal length for an image generated by the microdisplay is changed by adjusting a displacement between an image source such as a microdisplay and at least one optical element like a lens or by adjusting the optical power of an optical element which receives the light representing the image. The change in focal length results in a change in a region of the field of view of the display device in which the image of the virtual object appears to be displayed. In one example, multiple images, each including a virtual object, may be displayed to the user at a rate rapid enough so human temporal image fusion makes the images appear to be present at once to human eyes. In another example, a composite image of the in-focus portions of the virtual images generated at the different focal regions is displayed.

In one embodiment, the image generation unit 120 includes a microdisplay for projecting images of one or more virtual objects and coupling optics like a lens system for directing images from the microdisplay to a reflecting surface 124. The microdisplay may be implemented in various technologies including transmissive projection technology, micro organic light emitting diode (OLED) technology, or a reflective technology like digital light processing (DLP), liquid crystal on silicon (LCOS) and Mirasol® display technology from Qualcomm, Inc. The reflecting surface 124 directs the light from the image generation unit 120 into a light guide optical element 112, which directs the light representing the image into the user's eye.

FIG. 2B is a top view of an embodiment of one side of a see-through, near-eye, augmented reality display including a display optical system 14. A portion of the frame 115 of the near-eye display device 2 will surround a display optical system 14 for providing support and making electrical connections. In order to show the components of the display optical system 14, in this case 14r for the right eye system, in the head mounted display device 2, a portion of the frame 115 surrounding the display optical system is not depicted.

In the illustrated embodiment, the display optical system 14 is an integrated eye tracking and display system. The system embodiment includes an opacity filter 114 for enhancing contrast of virtual imagery, which is behind and aligned with optional see-through lens 116 in this example, light guide optical element 112 for projecting image data from the image generation unit 120 is behind and aligned with opacity filter 114, and optional see-through lens 118 is behind and aligned with light guide optical element 112.

Light guide optical element 112 transmits light from image generation unit 120 to the eye 140 of the user wearing head mounted, display device 2. Light guide optical element 112 also allows light from in front of the head mounted, display device 2 to be transmitted through light guide optical element 112 to eye 140, as depicted by axis 142 representing an optical axis of the display optical system 14r, thereby allowing the user to have an actual direct view of the space in front of head mounted, display device 2 in addition to receiving a virtual image from image generation unit 120. Thus, the walls of light guide optical element 112 are see-through. Light guide optical element 112 is a planar waveguide in this embodiment and includes a first reflecting surface 124 (e.g., a mirror or other surface) which reflects incident light from image generation unit 120 such that light is trapped inside the waveguide. A representative reflecting element 134E represents the one or more optical elements like mirrors, gratings, and other optical elements which direct visible light representing an image from the planar waveguide towards the user eye 140.

Infrared illumination and reflections, also traverse the planar waveguide for an eye sensor 134 for tracking the position of the user's eyes which may be used for applications such as gaze detection, blink command detection and gathering biometric information indicating a personal state of being for the user. The eye sensor 134 comprises an eye tracking IR illumination source 134A (an infrared light emitting diode (LED) or a laser (e.g. VCSEL)) and an eye tracking IR sensor 134B (e.g. IR camera, arrangement of IR photodetectors, or an IR position sensitive detector (PSD) for tracking glint positions). In this embodiment, representative reflecting element 134E also implements bidirectional infrared (IR) filtering which directs IR illumination towards the eye 140, preferably centered about the optical axis 142 and receives IR reflections from the user eye 140. In some examples, as part of the integrated eye tracking and display system, representative reflecting element 134E may include a hot mirror or gratings for implementing the bidirectional IR filtering. A wavelength selective filter 134C passes through visible spectrum light from the reflecting surface 124 and directs the infrared wavelength illumination from the eye tracking illumination source 134A into the planar waveguide. Wavelength selective filter 134D passes the visible light and the infrared illumination in an optical path direction heading towards the nose bridge 104. Wavelength selective filter 134D directs infrared radiation from the waveguide including infrared reflections of the user eye 140, preferably including reflections captured about the optical axis 142, out of the light guide optical element 112 embodied as a waveguide to the IR sensor 134B.

In other embodiments, the eye tracking unit optics are not integrated with the display optics. For more examples of eye tracking systems for HMD devices, see U.S. Pat. No. 7,401,920, entitled "Head Mounted Eye Tracking and Display System", issued Jul. 22, 2008 to Kranz et al., see U.S. patent application Ser. No. 13/221,739, Lewis et al., entitled "Gaze Detection in a See-Through, Near-Eye, Mixed Reality Display," filed Aug. 30, 2011, and see U.S. patent application Ser. No. 13/245,700, Bohn, entitled "Integrated Eye Tracking and Display System," filed Sep. 26, 2011, all of which are incorporated herein by reference.

Opacity filter 114, which is aligned with light guide optical element 112, selectively blocks natural light from passing through light guide optical element 112 for enhancing contrast of virtual imagery. When the system renders a scene for the augmented reality display, it takes note of which real-world objects are in front of which virtual objects and vice versa. If a virtual object is in front of a real-world object, then the opacity is turned on for the coverage area of the virtual object. If the virtual object is (virtually) behind a real-world object, then the opacity is turned off, as well as any color for that display area, so the user will only see the real-world object for that corresponding area of real light. The opacity filter assists the image of a virtual object to appear more realistic and represent a full range of colors and intensities. In this embodiment, electrical control circuitry for the opacity filter, not shown, receives instructions from the control circuitry 136 via electrical connections routed through the frame. More details of an opacity filter are provided in U.S. patent application Ser. No. 12/887,426, "Opacity Filter For See-Through Mounted Display," filed on Sep. 21, 2010, incorporated herein by reference in its entirety.

As noted, FIGS. 2A and 2B only show half of the head mounted display device 2. A full head mounted display device would include another set of optional see-through lenses 116 and 118, another opacity filter 114, another light guide optical element 112, another image generation unit 120, physical environment facing capture devices 113 (also referred to as outward facing or front facing capture devices 113), eye sensor 134, and earphone 130. Additional details of a head mounted personal A/V apparatus are illustrated in U.S. patent application Ser. No. 12/905,952 entitled "Fusing Virtual Content Into Real Content", Filed Oct. 15, 2010, fully incorporated herein by reference.

In the embodiments above, the specific number of lenses shown are just examples. Other numbers and configurations of lenses operating on the same principles may be used. Additionally, in the examples above, the right side of the see-through, near-eye display device 2 is shown. A full near-eye, mixed reality display device may include as examples another set of lenses 116 and/or 118, another lightguide optical element 112 for the embodiments of FIGS. 5C and 5D, another image generation unit 120, another lens system 122, likely another environment facing capture devices 113, another eye sensor 134 for the embodiments of FIGS. 3A to 3B, earphones 130, and a temperature sensor 138.

Figure 3A:
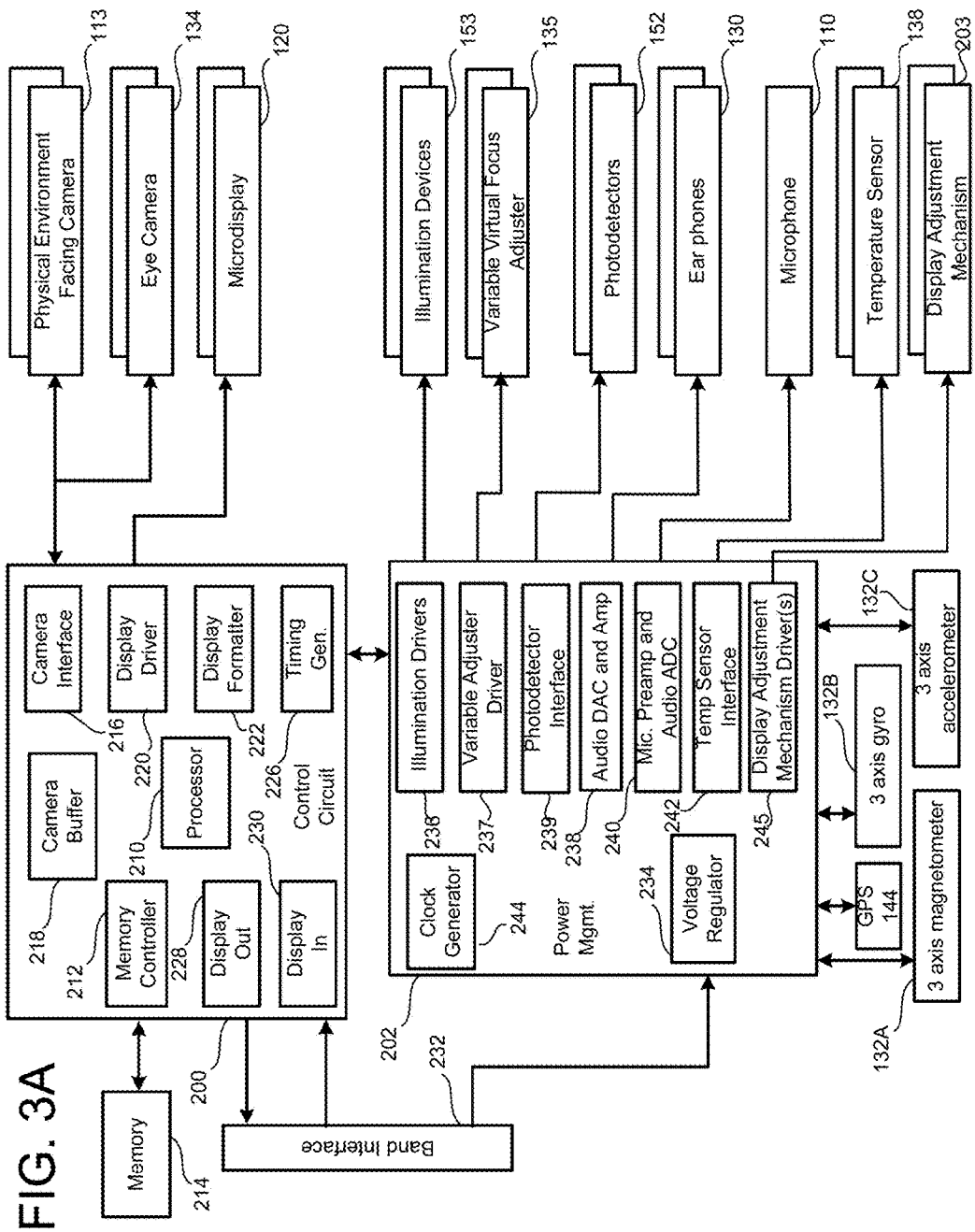
FIG. 3A is a block diagram of one embodiment of hardware and software components of a see-through, near-eye, mixed reality display unit as may be used with one or more embodiments.
Figure 3B:
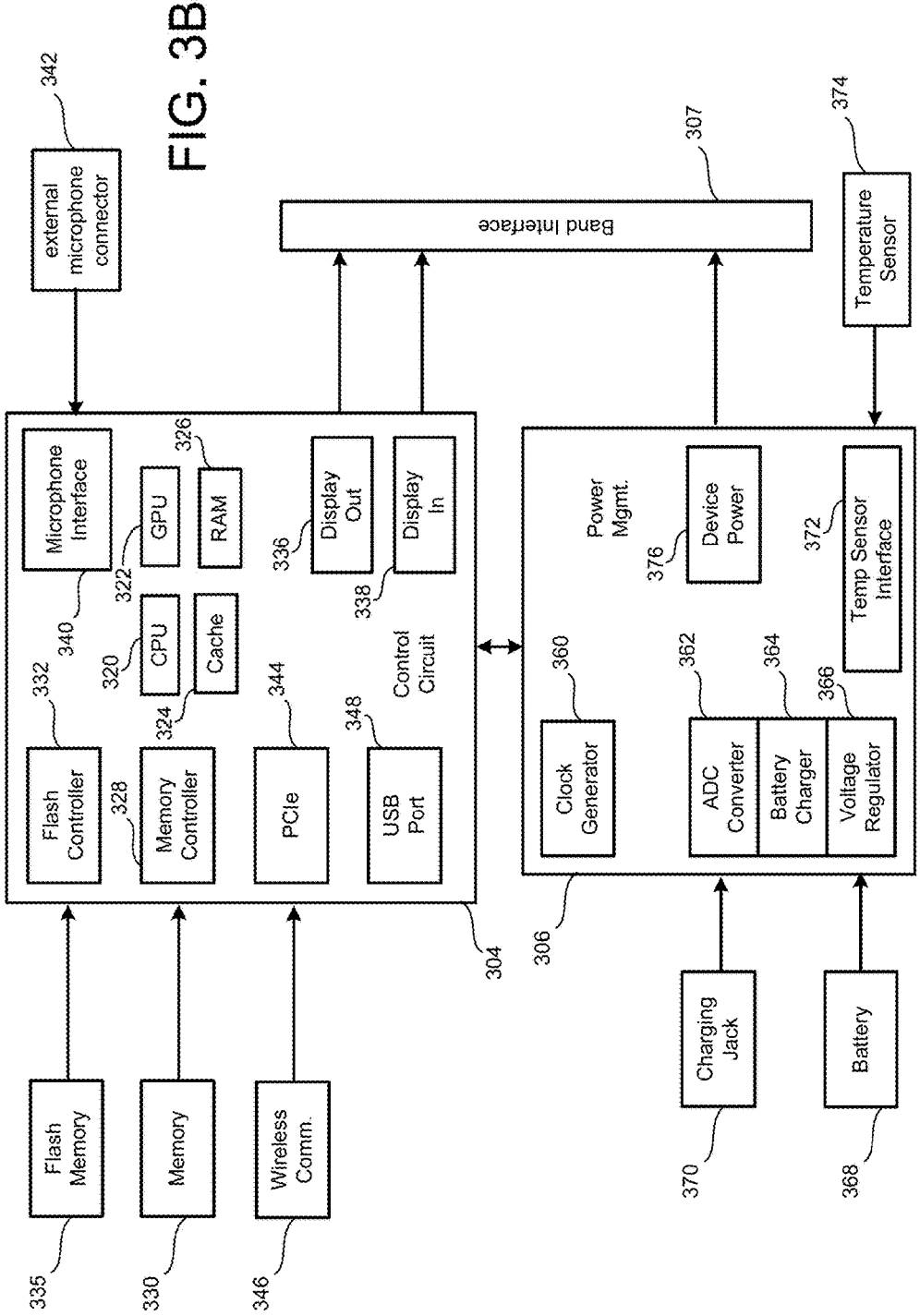
FIG. 3B is a block diagram of one embodiment of the hardware and software components of a processing unit associated with a see-through, near-eye, mixed reality display unit.

FIG. 3A is a block diagram of one embodiment of hardware and software components of a see-through, near-eye, mixed reality display unit 2 as may be used with one or more embodiments. FIG. 3B is a block diagram describing the various components of a processing unit 4. In this embodiment, near-eye display device 2, receives instructions about a virtual image from processing unit 4 and provides the sensor information back to processing unit 4. Software and hardware components which may be embodied in a processing unit 4 are depicted in FIG. 3B, will receive the sensory information from the display device 2 (See FIGS. 1A and 1B). Based on that information, processing unit 4 will determine where and when to provide a virtual image to the user and send instructions accordingly to the control circuitry 136 of the display device 2.

Note that some of the components of FIG. 3A (e.g., physical environment facing capture devices 113, eye sensor 134, variable virtual focus adjuster 135, detection area 139, image generation unit 120, illuminators 153, earphones 130, temperature sensor 138, display adjustment mechanism 203) are shown in shadow to indicate that there are at least two of each of those devices, at least one for the left side and at least one for the right side of head mounted display device 2. FIG. 3A shows the control circuit 200 in communication with the power management unit 202. Control circuit 200 includes processor 210, memory controller 212 in communication with memory 214 (e.g., D-RAM), camera interface 216, camera buffer 218, display driver 220, display formatter 222, timing generator 226, display out 228, and display in interface 230. In one embodiment, all of components of driver 220 are in communication with each other via dedicated lines of one or more buses. In another embodiment, each of the components of control circuit 200 are in communication with processor 210.

Camera interface 216 provides an interface to the two physical environment facing capture devices 113 and each eye sensor 134 and stores respective images received from the device 113, and sensor 134 in camera buffer 218. Display driver 220 will drive image generation unit 120. Display formatter 222 may provide information, about the virtual image being displayed on image generation unit 120 to one or more processors of one or more computer systems, e.g. 4, 210 performing processing for the augmented reality system. Timing generator 226 is used to provide timing data for the system. Display out 228 is a buffer for providing images from physical environment facing capture devices 113 and the eye sensor 134 to the processing unit 4. Display interface 230 is a buffer for receiving images such as a virtual image to be displayed on image generation unit 120. Display out 228 and display interface 230 communicate with band interface 232 which is an interface to processing unit 4.

Power management unit 202 includes voltage regulator 234, eye tracking illumination driver 236, variable adjuster driver 237, photodetector interface 239, audio DAC and amplifier 238, microphone preamplifier and audio ADC 240, temperature sensor interface 242, display adjustment mechanism driver(s) 245 and clock generator 244. Voltage regulator 234 receives power from processing unit 4 via band interface 232 and provides that power to the other components of head mounted display device 2. Illumination driver 236 controls, for example via a drive current or voltage, the illuminators 153 to operate about a predetermined wavelength or within a wavelength range. Audio DAC and amplifier 238 receives the audio information from earphones 130. Microphone preamplifier and audio ADC 240 provides an interface for microphone 110. Temperature sensor interface 242 is an interface for temperature sensor 138. One or more display adjustment drivers 245 provide control signals to one or more motors or other devices making up each display adjustment mechanism 203 which represent adjustment amounts of movement in at least one of three directions. Power management unit 202 also provides power and receives data back from three axis magnetometer 132A, three axis gyro 132B and three axis accelerometer 132C. Power management unit 202 also provides power and receives data back from and sends data to GPS sensor 144.

The variable adjuster driver 237 provides a control signal, for example a drive current or a drive voltage, to the adjuster 135 to move one or more elements of the microdisplay assembly 173 to achieve a displacement for a focal region calculated by software executing in a processor 210 of the control circuitry 13, or the processing unit 4, or both. In embodiments of sweeping through a range of displacements and, hence, a range of focal regions, the variable adjuster driver 237 receives timing signals from the timing generator 226, or alternatively, the clock generator 244 to operate at a programmed rate or frequency.

The photodetector interface 239 performs any analog to digital conversion used for voltage or current readings from each photodetector, stores the readings in a processor readable format in memory via the memory controller 212, and monitors the operation parameters of the photodetectors 152 such as temperature and wavelength accuracy.

FIG. 3B is a block diagram of one embodiment of the hardware and software components of a processing unit 4 associated with a see-through, near-eye, mixed reality display unit. The processing unit 4 may include this embodiment of hardware and software components as well as similar components which perform similar functions. FIG. 3B shows controls circuit 304 in communication with power management circuit 306. Control circuit 304 includes a central processing unit (CPU) 320, graphics processing unit (GPU) 322, cache 324, RAM 326, memory control 328 in communication with memory 330 (e.g., D-RAM), flash memory controller 332 in communication with flash memory 335 (or other type of non-volatile storage), display out buffer 336 in communication with see-through, near-eye display device 2 via band interface 307 and band interface 232, display in buffer 338 in communication with near-eye display device 2 via band interface 307 and band interface 232, microphone interface 340 in communication with an external microphone connector 342 for connecting to a microphone, PCI express interface for connecting to a wireless communication component 346, and USB port(s) 348.

In one embodiment, wireless communication component 346 can include a Wi-Fi enabled communication device, Bluetooth communication device, infrared communication device, etc. The USB port can be used to dock the processing unit 4 to a secondary computing device in order to load data or software onto processing unit 4, as well as charge processing unit 4. In one embodiment, CPU 320 and GPU 322 are the main workhorses for determining where, when and how to insert images into the view of the user.

Power management circuit 306 includes clock generator 360, analog to digital converter 362, battery charger 364, voltage regulator 366, see-through, near-eye display power interface 376, and temperature sensor interface 372 in communication with temperature sensor 374 (located on the wrist band of processing unit 4). An alternating current to digital converter 362 is connected to a charging jack 370 for receiving an AC supply and creating a DC supply for the system. Voltage regulator 366 is in communication with battery 368 for supplying power to the system. Battery charger 364 is used to charge battery 368 (via voltage regulator 366) upon receiving power from charging jack 370. Device power interface 376 provides power to the display device 2.

The system described above can be used to add virtual images to a user's view such that the virtual images are mixed with real images that the user see. In one example, the virtual images are added in a manner such that they appear to be part of the original scene. Examples of adding the virtual images can be found U.S. patent application Ser. No. 13/112,919, "Event Augmentation With Real-Time Information," filed on May 20, 2011; and U.S. patent application Ser. No. 12/905,952, entitled "Fusing Virtual Content Into Real Content," filed on Oct. 15, 2010; both applications are incorporated herein by reference in their entirety.

To provide a mixed reality environment wherein natural user interactions with virtual objects can be learned by a display system, a multitude of inputs is monitored to determine and link input actions by a user to aspects of a virtual object, including functions of the virtual object. Virtual objects may have functions that mimic real world objects, or be unrelated to real world objects. In this context, functions may alter physical state, object actions and object responses to an input, such as a user input. Each virtual object may be rendered through an understanding of a description of the object used by the display device to render the object and interactions between the object and other real and virtual objects. In order to learn new functions and inputs, the description of the object may be modified to reflect the new inputs and functions. In order to make the interaction with the objects as natural for humans as possible, a multitude of inputs may be used to provide input data creating the input actions which drive the functions of a virtual object.

Figure 4A:
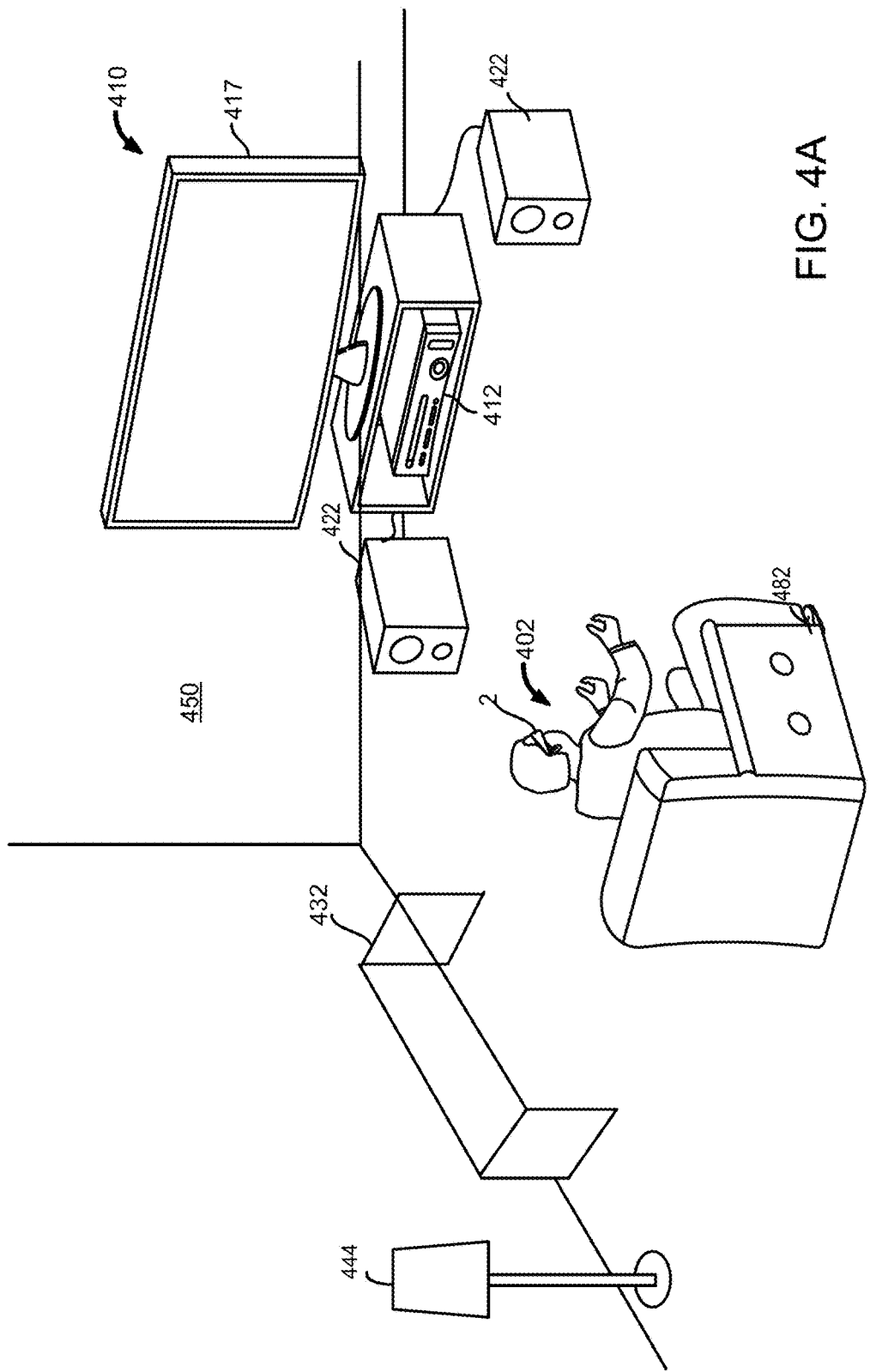
FIG. 4A is a depiction of an environment with real and virtual objects.
Figure 4B:
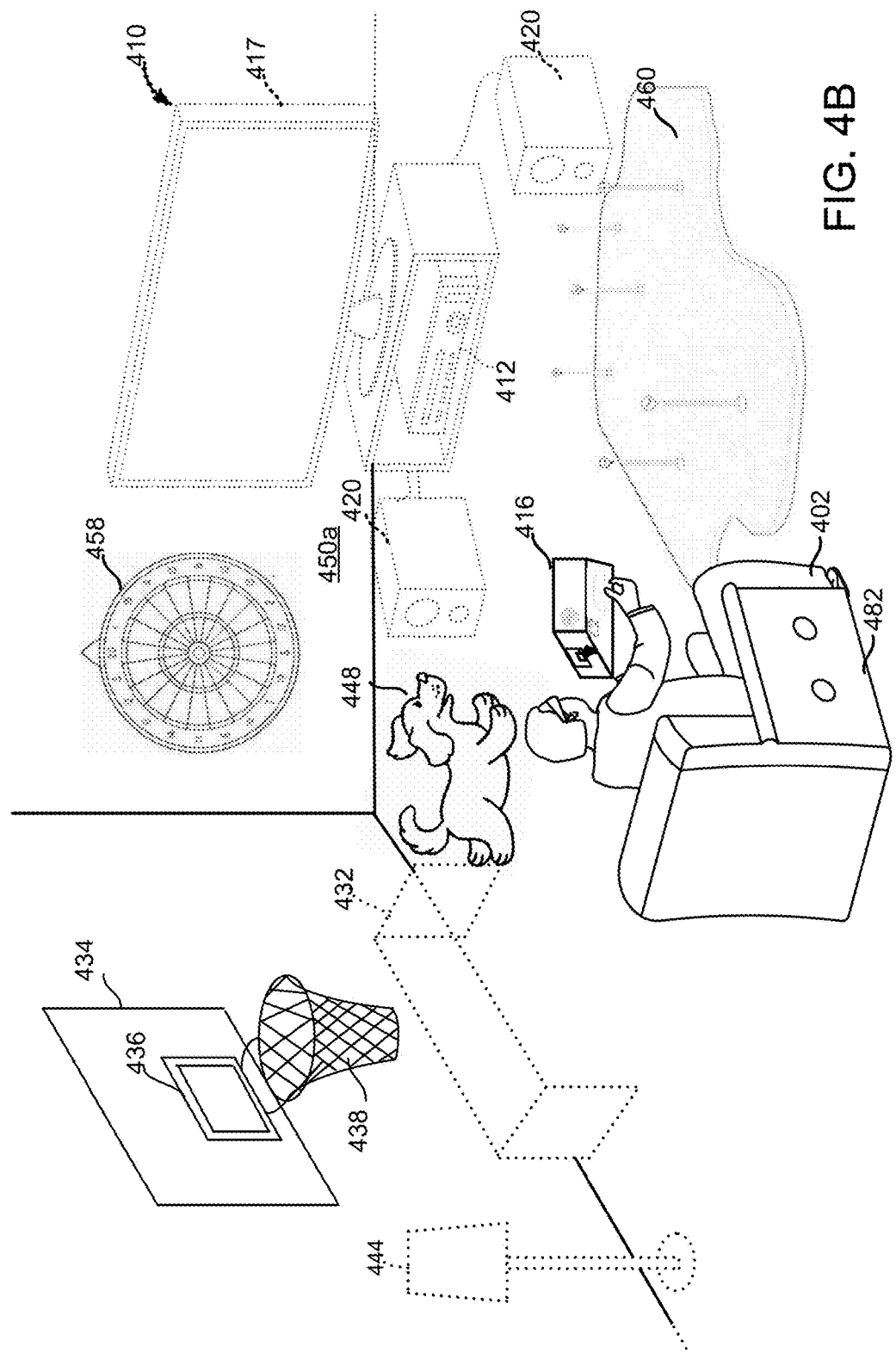
FIG. 4B is a depiction of a virtual environment overlying a real environment.

FIGS. 4A-4B illustrate various aspects of configured environments relative to real world environments. In the examples shown in FIG. 4A-4C, a user living room is shown. It should be understood that configured environments may be defined based on any of a number of different types of physical environments.

FIG. 4A is a perspective view of a user 402 sitting in an environment 450. Each object in the environment 450 constitutes a real world object. This may include an entertainment system 410 having a display 417, speakers 422, and a computing system 412. Computing system 412 may be a personal computer, an entertainment console, or any of a number of different types of media presentation or processing devices including those illustrated in FIGS. 13 and 14 herein. The environment 450 also includes a lamp 444 and a table 432, which constitute real objects in the environment 450. In one example, the environment 450 is bounded by walls, floor and a ceiling (not shown). As noted above, environment can have many different types of physical definitions.

In accordance with the present technology, an configured environment may be constructed based on a source physical environment and include a set of one or more virtual objects. In this context, the term virtual object includes holographic generations of features of an environment and well as functional virtual objects. Configured environments based on a source environment may be rendered for a user in the source environment or in a different physical environment. This rendering environment may therefor comprise the source physical environment or a different physical environment.

As illustrated in FIG. 4B, a virtual environment 450A is illustrated in the context of the real world environment 450. In FIG. 4B, real world objects other than the walls, user 402 and chair 482 are illustrated in phantom to indicate that, in one embodiment, they may be visually suppressed by virtual elements in the configured environment. In environment 450A, the virtual environments include a backboard 434, having a target 435 and a basketball hoop 438, a virtual dartboard 458, a virtual dog 448, and a virtual putting green 460. In this context, the virtual environment comprises a set of elements that are virtual objects which are defined relative to the real world environment 450 and designed to be placed on various elements of the real world environment and real world objects. Virtual objects in the configured environment may not take into account all elements or real world objects in a particular environment, but may, in some embodiments, obscure elements of the real world environment or, in other embodiments, may interact with elements of the real world embodiment. As illustrated in FIG. 4B, each of the virtual objects 434, 435, 438, 458, 448, 460 is placed around the real objects in the room.

In one embodiment, user 402 may include a controller interface 416. Controller interface 416 may be visible only to user 402 with a display device 2 and may, in one embodiment, comprising miniature projection of the environment 450A including all the virtual objects shown therein. A user can use the controller interface 416 to manipulate the virtual objects in the configured environment 450A. The controller interface 416 may allow a user to select, add, move, scale, and/or move virtual objects in the environment 450A. In another alternative, the user interface may comprise a user interacting directly with a virtual object at its projected location in the space of environment 450A. The environment is "configured" in that all of the elements comprising the virtual elements in the set are contained within a configured environment definition which may be stored in a processing unit 4, or in a missed reality object handling service 570 which can be provided to the user 402.

Figure 4C:
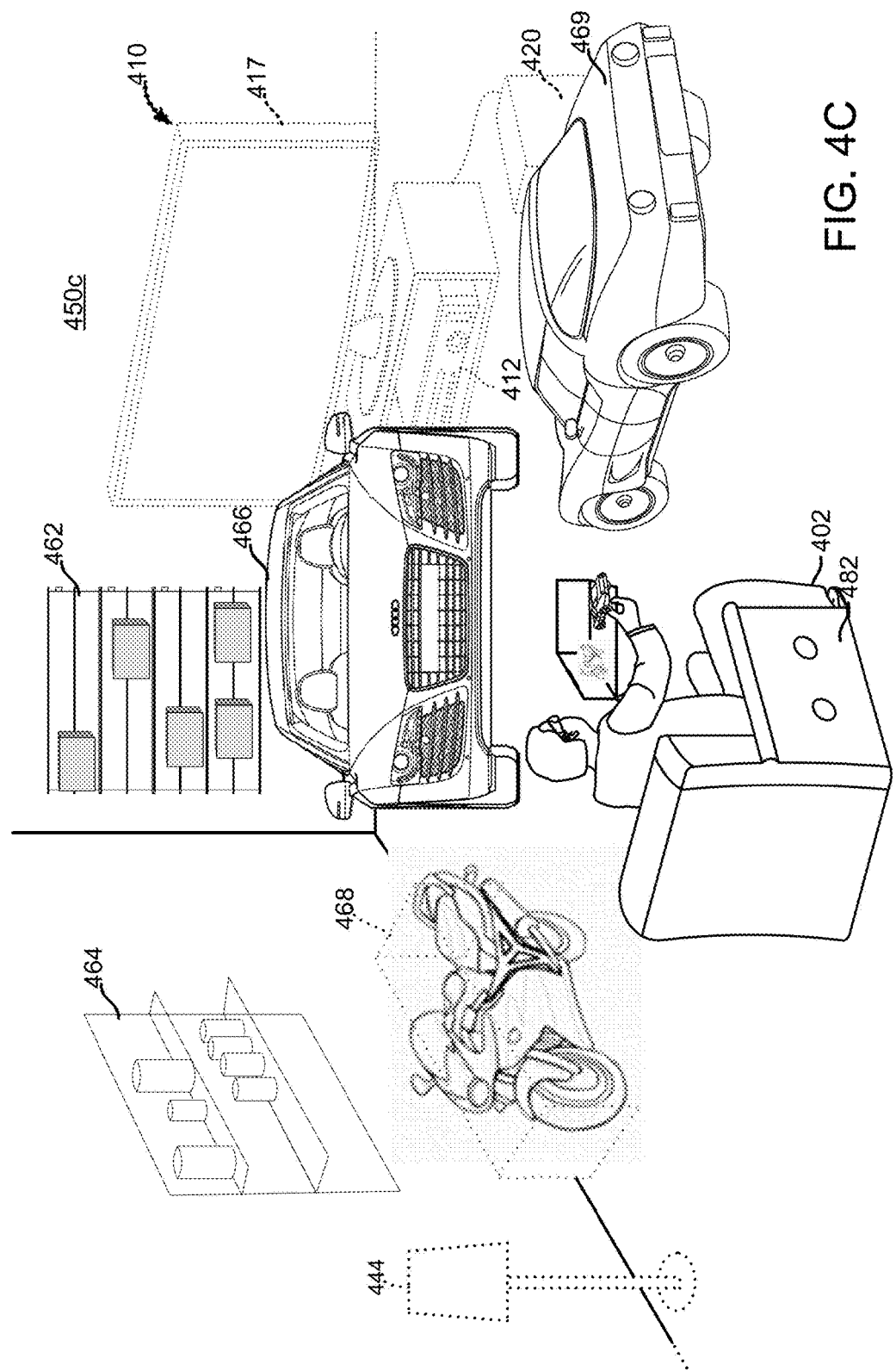
FIG. 4C is a second depiction of a virtual environment overlying a real environment.

FIG. 4C illustrates a second virtual environment 450C wherein a plurality of virtual objects can simply be rendered to display over, partially or fully obscuring, real world objects. In environment 450C, a user's "garage" is shown. In this configured environment 450c, the garage is the source environment while the living room (environment 450) is the rendering environment. The source environment garage may include real world features such as shelves 462, 464. In this embodiment, shelves 462 and 464 including the items thereon may be placed in the same relative perspective as they would be to the user if the user were sitting in the user's garage. Alternatively, shelves 462,464 may be virtual shelves having no real-world counterparts in the source environment garage. Likewise, the user's cars 466 and 469 and motorcycle 467 may all placed in the same relative positions as they would be where the user is sitting in the same relative place in the user's garage, or they may be virtual objects added to the configured environment garage.

Once rendered in the rendering environment, the virtual objects can be moved around the garage and placed in different locations and as such would appear differently in the projected configured environment 450C shown in FIG. 4C.

In each of the embodiments shown in FIGS. 4B and 4C, the user may be provided with a (real or virtual) controller interface 416 which allows the user to manipulate the virtual objects shown in environment 450B or 450C. Again, real world objects in the room are shown in phantom to indicate that the walls of the user's garage may be projected over the real world objects in the rendering environment, partially or fully obscuring the real world objects in the user's real world environment 450.

Each configured environment definition may comprise a mapping defined in terms of real objects. Real objects may be translated into virtual objects to create a virtual object environment definition. As such, virtual objects may be created from real objects and may include virtual features such as walls, doors and/or other room features. It should be further recognized that once an object definition for a real object is created, a virtual object equivalent to that real object may be created. For example, if a real object is defined for a real shelf, that real object definition can be converted to a virtual object based on the characteristics recognized for the shelf. Physical characteristics can be input based on device inputs to create shape, texture and other physical elements, while behaviors and physical actions of the shelf can be understood from a generic object definition, or added as recognized by the system.

Figure 5:
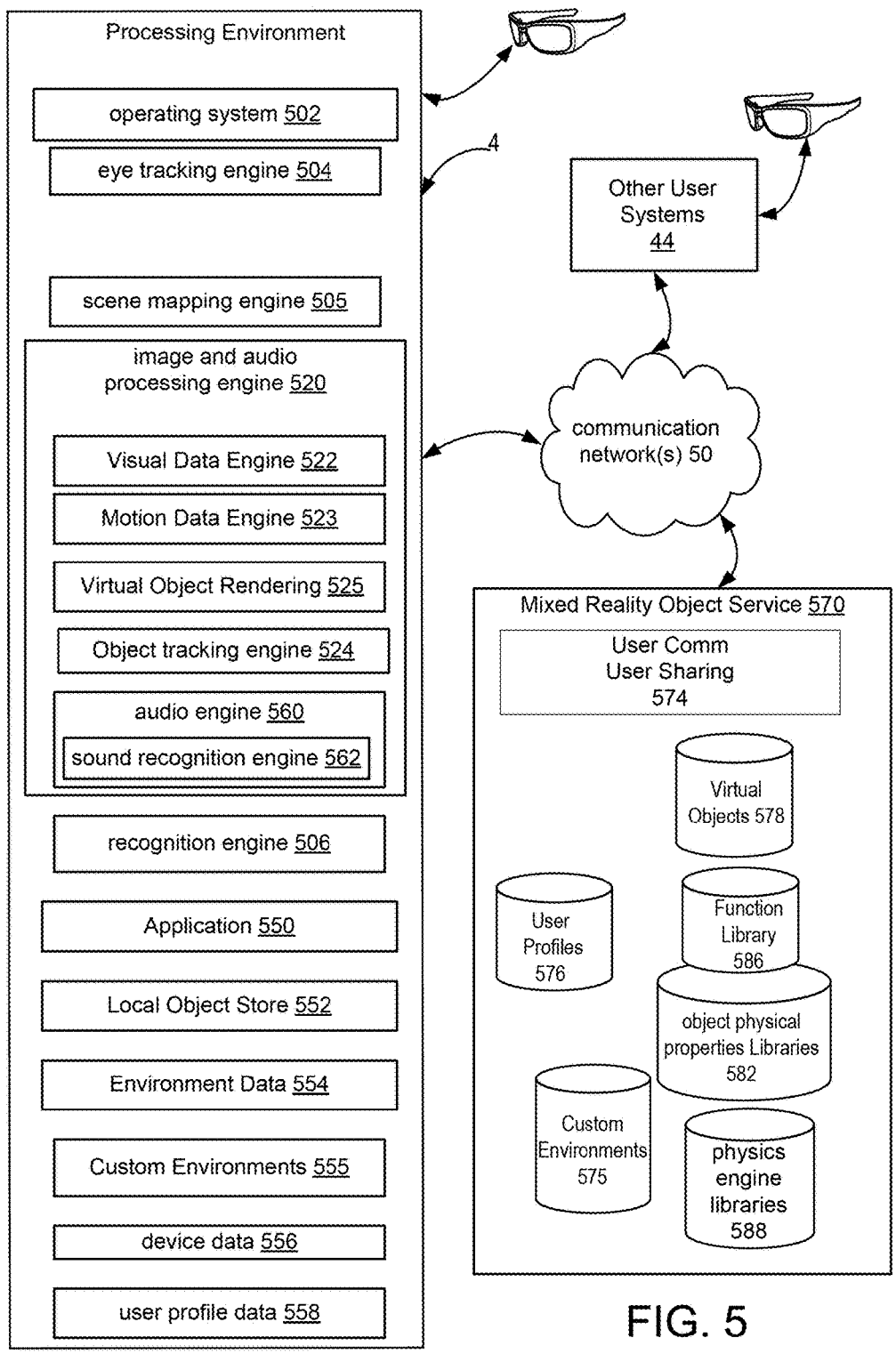
FIG. 5 is a block diagram of software functions in a processing unit of a see through head mounted display device.

FIG. 5 illustrates the functional components of the processing environment a processing unit 4 and a mixed reality object service 570, relative to communication networks 50 and other user systems. FIG. 5 is a block diagram of the system from a software perspective for providing a mixed reality environment within see through head mounted mixed reality system 10, including the components operating in a processing unit 4. FIG. 5 illustrates a processing unit 4 from a software perspective which may be implemented the system 10, one or more remote computing systems 12 in communication with one or more systems 10, or a combination of these. Network connectivity allows leveraging available computing resources including a mixed reality object service 570 and shared elements from other user system 44 which may be display systems 10.

As shown in the embodiment of FIG. 5, the software components of a processing unit 4 comprise an operating system 502, eye tracking engine 504, input recognition engine 506, scene mapping engine 508, image and audio processing engine 520, an input recognition engine 506, a learning engine 545, mixed reality application 550, local object store 552, environment data 554, device data 556, and user profile data 558. Image and audio processing engine 520 includes an visual data engine 522, a motion data engine 523, an audio engine 560, virtual object rendering engine 528 and object tracking engine 524. Not illustrated are image and audio data buffers which provide memory for receiving image data captured from hardware elements on the device 2.

Operating system 502 provides the underlying structure to allow hardware elements in the processing unit 4 to interact with the higher level functions of the functional components shown in FIG. 5.

Eye tracking engine 504 tracks the user gaze with respect to movements of the eye relative to the device 2. Eye tracking engine 504 can identify the gaze direction or a point of gaze based on people position and eye movements and determine a command or request.

Input recognition engine 506 may identify actions performed by a user indicating a control or command to an executing application 550. The input action may be performed by a body part of a user e.g. a hand or a finger, but also may include a eye blink sequence, a verbal utterance, motion, a series of user motions or any combination of motions, sounds and actions of a user which may be perceived by a system 10. In one embodiment, the input recognition engine 506 includes a collection of gesture filters, each comprising information concerning a gesture that may be performed by at least a part of a skeletal model. The recognition engine 506 compares skeletal model and movements associated with it derived from the captured image added to the gesture filters in a input action library to identify when a user has performed one or more gestures. In some examples, matching an image data to image models of a user's hand or finger during a gesture may be used rather than skeletal tracking for recognizing gestures.

Image and audio processing engine 520 processes image data depth and audio data received from one or more captured devices which might be available in a given location. Image and audio processing engine 520 processes image data (e.g. video or image), depth and audio data received from one or more captured devices which may be available from the device. Image and depth information may come from outward facing sensors captured as the user moves his or her body. A 3D mapping of the display field of view of the augmented reality display device 2 can be determined by the scene mapping engine 508, based on captured image data and depth data for the display field of view. A depth map can represent the captured image data and depth data. A view dependent coordinate system may be used for mapping of the display field of view as how interactions between object appear to a user depends on the user's point of view. An example of the view dependent coordinate system is an X, Y, Z, coordinate system in which the Z-axis or depth axis extends orthogonally or as a normal from the front of a see through display device 2. At some examples, the image and depth data for the depth map are presented in the display field of view is received from capture devices 113 on the front of display device 2. The display field of view may be determined remotely or using a set of environment data 554 which is previously provided based on a previous mapping using the scene mapping engine 508.

A 3D mapping of the display field of view of the augmented reality display can be determined by the scene mapping engine 505 based on captured image data and depth data for the display field of view. A depth map can represent the captured image data and depth data. A view dependent coordinate system may be used for the mapping of the display field of view as how a collision between objects appears to a user depends on the user's point of view. An example of a view dependent coordinate system is an x, y, z coordinate system in which the z-axis or depth axis extends orthogonally or as a normal from the front of the see-through display. In some examples, the image and depth data for the depth map representing the display field of view is received from the devices 113 on the front of the display device 2. The display field of view may also be determined remotely or using a combination of remote (e.g. 12 or another display apparatus 8) and local processing.

Mapping what is around the user in the user's environment can be aided with sensor data. Data from an orientation sensor 132, e.g. a three axis accelerometer and a three axis magnetometer, determines position changes of the user's head and correlation of those head position changes with changes in the image and depth data from the front facing capture devices 113 can identify positions of objects relative to one another and at what subset of an environment a user is looking. As mentioned above, depth map data of another HMD device, currently or previously in the environment, along with position and head orientation data for this other HMD device can also be used to map what is in the user environment. Shared real objects in their depth maps can be used for image alignment and other techniques for image mapping. With the position and orientation data as well, what objects are coming into view can be predicted as well so physical interaction processing, occlusion and other processing can start even before the objects are in view.

The scene mapping engine 505 can also use a view independent coordinate system for 3D mapping. The map can be stored in the view independent coordinate system in a storage location (e.g. via service 570) accessible as well by other personal A/V apparatus 8, other computer systems 12 or both, be retrieved from memory and be updated over time as one or more users enter or re-enter the environment. In some examples, image and object registration into a common coordinate system may be performed using an extrinsic calibration process. The registration and/or alignment of images (or objects within the images) onto a common coordinate system allows the scene mapping engine to be able to compare and integrate real-world objects, landmarks, or other features extracted from the different images into a unified 3-D map associated with the real-world environment.

When a user enters an environment, the scene mapping engine 505 may first search for a pre-generated 3D map identifying 3D space positions and identification data of objects stored locally or accessible from another personal A/V apparatus 8 or a network accessible computer system 12. The map may include stationary objects. The map may also include objects moving in real time and current light and shadow conditions if the map is presently being updated by another system. For example, a pre-generated map indicating positions, identification data and physical properties of stationary objects in a user's living room derived from image and depth data from previous HMD sessions can be retrieved from memory. Additionally, identification data including physical properties for objects which tend to enter the location can be preloaded for faster recognition. A pre-generated map may also store physics models for objects as discussed below. A pre-generated map may be stored in a network accessible database environment data 554.

An object tracking engine 524 tracks each of the objects in a user's field of view, both virtual and real, to object instances maintained in the processing unit 4. When virtual object rendering engine 525 renders an object in a display device 2, instances of the object are maintained by the object tracking engine 524 to understand the position of the virtual object relative to the coordinate system in use. Object recognition engine 506 keeps track of movements and positions of real and virtual objects within an environment, allowing the rendering engine 525 to provide object interactions based on the virtual objects provided by the application 550.

The virtual object rendering engine 525 may utilize data from the local object store 552 and local environment data 554 to create virtual objects within an environment. In addition, objects may be available from the mixed reality object service 570. Objects available from the mixed reality object service 570 may include shared objects from other user system 44, objects prepared by application providers for use with applications 550, and elements used to create customized or learned actions relative to user-specific virtual objects.

Virtual object rendering engine 525 renders each instance of a three dimensional holographic virtual object within the display of a display device 2. Object rendering engine 528 works in conjunction with object tracking engine 524 to track the positions of virtual objects within the display. The virtual objects rendering engine 525 uses the object definition contained within the local object store as well as the instance of the object created in the processing engine 520 and the definition of the objects visual and physical parameters to render the object within the device. The rendering engine 525 uses the physics data which is provided in the definition to control movement of any virtual objects rendered in the display and interprets various rendered object definitions to display interactions of objects. Local object store 552 contains object definitions which may be associated with the user, or cached object definitions provided by a mixed reality object service 570.

Environment data 554 may contain a three dimensional mapping of a user environment created by scene mapping engine 505 as well as one or more preconfigured environment comprising a series of objects associated with physical environment. Device data 556 may include information identifying the specific device including an identifier for the processing unit 4 including, for example, a network address, an IP address, and other configuration parameters of the specific device in use.

User profile data 558 includes user specific information such as user specific objects, and preferences associated with one or more users of the device.

One or more configured environments 555 may be stored in processing unit 4. As noted above, each processing environment may be based on a source physical environment, the data for which is saved with the configured environment 555 or referenced by the configured environment and saved in environment data 554. Each configured environment 555 includes a set of one or more virtual objects, which may be saved with the configured environment or in the local object store 552 and referenced by the configured environment 555.

In some embodiments, a mixed reality object service 570 may be provided. The mixed reality object service 570 may comprise one or more computers operating to provide a service via communication network 50 in conjunction with each of the processing unit 4 coupled as part of a mixed reality display system 10. The mixed reality object service 570 can include a user communication and sharing engine 574, a user profile store 576, a virtual object store 578, object physical properties libraries 582, functional libraries 586 and physics engine libraries 588. A configured environment store 575 may also be provided.

The mixed reality object service 570 provides definitions of virtual objects where an application 550 may call for a virtual object to provide to the rendering engine 528. In this context, object store 578 may provide, for example, a set of virtual objects created by application providers and accessible to processing units 4.

User communication and sharing engine 574 allows processing unit 4 and other user system 44 to connect to the mixed reality object handling service 570, submit customized objects and user data, share objects between users, and access virtual objects provided by application providers. It should be understood that in other embodiments, various users may communicate using systems 20 in a peer-to-peer manner, so that customized virtual objects may be shared between users without the use of a mixed reality object service.

The user profile store 576 may include information identifying the user to the mixed reality object service 570 and allowing that service to provide user owned objects and generic object libraries to different processing environments. Customized virtual object 584 may comprise objects which have been created by various learning engines 545 of processing unit 4 and other users system 44 and which are provided to the service 570.

The communication and sharing engine 574 may access physical properties libraries 582, physics engine libraries 588 and function libraries 586 in creating a object definitions and customized objects. The function libraries 586 contains a variety of functions that can be linked to virtual objects to add functionality to the objects. Functions may or may not include interfaces to the real world environment where the user is present. For example, virtual objects may interface with a light switch input to turn on a real light in a room. Similar interfaces can be provided for myriad connections to real world impacts. Physics engine libraries 588 contain physics definitions for virtual objects and physical properties libraries 58 contain various physical properties, all of which can be combined in various manners to create different, custom objects.

User communication and user sharing in 574 allows users on other systems 44 to interact via the mixed reality object service 570 with instances of the objects identified by the tracking engine 572. Direct communication between the systems 44 and processing unit 4 may occur, or processing may be handled by the mixed object reality service. Such processing may include handling of collisions, occlusion, and other information. In one embodiment, each processing unit 4 includes an object tracking engine 524 which tracks other user's objects as well as objects which are defined by the virtual object rendering engine 528 to ascertain how interactions between both user objects and objects from other users may be handled.

User profiles store 576 information identifying users, user-specific systems 10, and links to user owned objects which may be used to enhance a user experience with a system 10.

Configured environment store 575 may contain configured environment definitions associated with individual users which may be stored for the benefit of a user or to allow the user to share the environment with other users.

Figure 6A:
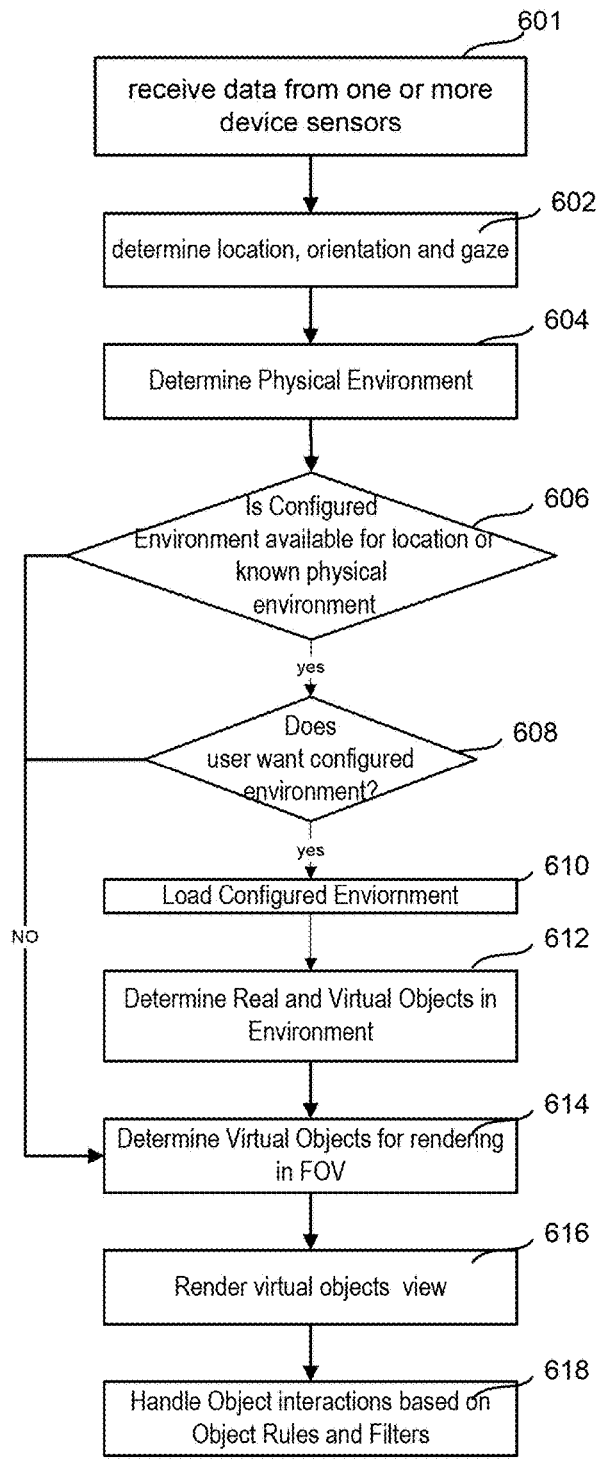
FIG. 6A is a flowchart illustrating a method of providing a configured environment to a user.

FIG. 6A illustrates a general method for rendering and tracking objects, and rendering a configured environment for a user in accordance with the present technology. It may be understood that the method of FIG. 6 may be performed by a see through head mounted display device 2 in conjunction with the processing unit 4. In some contexts, the steps of FIG. 6 may be performed by a server in conjunction with the see through head mounted display device 2. Certain steps in the process of FIG. 6 are not illustrated. For example, when a user first puts a see through head mounted display device on, an initialization sequence will register the movements of the user to the device, additionally, user's position in a global coordinate system, such as a global positioning system (GPS) may be determined. Alternatively, once initialized, the system is prepared to understand the environment and where to render virtual objects.

In addition, where a user allows personal information such as location, biometric or identification information to be used by the system 10, the user may be asked to take an affirmative action before the data is collected. In addition or in the alternative, a user may be provided with the opportunity take an affirmative action to prevent the collection of data before that data is collected. This consent may be provided during an initialization phase of the system 10.

For each user at 601, sensor data from any or all of the sensors described with respect to FIGS. 1-3B is received. At step 602, the user's location, orientation, and gaze within the display device to are determined. The user's gaze, orientation and location may determine the user's field of view and what objects are within the user's field of view and may be within the user's potential field of view in his surrounding environment. It may be understood that the user's location may be a relative location. That is, the location may not be a location relative to any world positioning system, but may be registered to a local environment where the user is located or relative to the user himself. At 604, the physical environment is determined. One method for determining the physical environment involves mapping the user's real world environment using data gathered by the see through head mounted display device 2. This mapping step can determine the physical boundaries of the user's environment as well as determining which objects are within the physical environment.

Once the physical environment is determined in 604, a determination is made at step 606 as to whether or not a configured embodiment is available for a given location or a known physical environment. Configured embodiments may be tied to source locations which are determinable from geo-location information, or localized location information. Alternatively, a known physical environment which has been defined by user to include specific parameters, such as the location of the user's walls, furniture, and other items which would identify the particular physical environment, can have associated therewith a configured environment. If a configured environment is not available, then real and virtual objects in the environment are determined at 612 in accordance with the application which is executing on the processing unit 4.

If a configured environment is available, the user may be offered a choice at step 608 as to whether or not the user wishes to enable the configured environment. Certain configured environments may be subject to the user's selection of enablement. For example, where a configured environment is provided by a public establishment, a user's presence in the public establishment may generate a prompt for the user to select whether or not the user wishes to utilize the configured environment. If the user selects the configured environment, then the configured environment will be loaded at 610. Loading the configured environment can include loading any of a number of parameters to enable the system to generate the virtual objects and other configuration elements of the configured environment at step 610. At step 612, the real and virtual objects in the environment may be determined. In the case where a configured environment consists of virtual objects which were designed to overlay real objects in a rendering environment in which the configured environment is rendered, real objects may be determined so that interaction between the real and virtual objects can occur. In other cases, a virtual configured environment can completely obscure all the real elements in a rendering environment, so that a user only sees the configured environment rendered in the display device 2. As noted above, not all virtual objects in a particular environment may be rendered in a particular user's field of view. Because a user's field of view is more limited than the environment in which the plurality of virtual objects may be provided, a subset of the elements which may be rendered for the user's field of view is determined at step 614. At 616, virtual objects are rendered in the user's field of view and at 618, objects interactions are handled in accordance with the object rules and filters as described, for example in co-pending application Ser. No. 13/532,636 entitled "OBJECT-CENTRIC MIXED REALITY SPACE", inventors Peter Tobias Kinnebrew and Nicholas Ferianc Kamuda, filed Jun. 25, 2012, assigned to the assignee of the present application and hereby fully incorporated by reference herein.

Figure 6B:
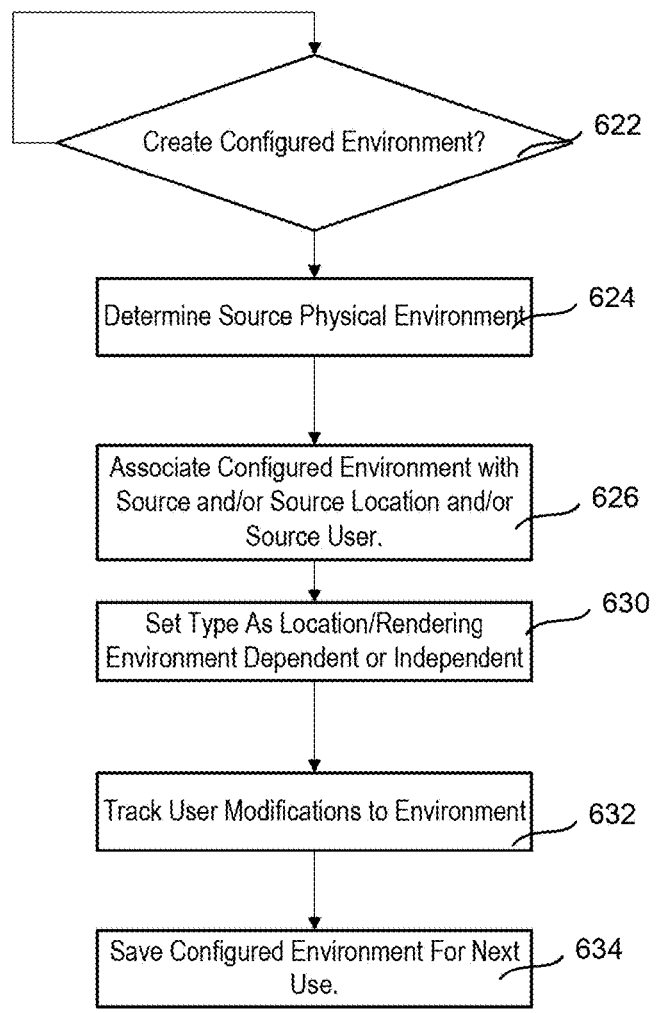
FIG. 6B illustrates a method for creating a configured environment.

FIG. 6B illustrates one method for creating a configured environment. At step 622, a determination is made as to whether a user wishes to create a configured environment. Configured environments begin as a combination of a source physical environment and associated virtual objects. In this context, virtual objects may include virtual features such as walls, doors and/or other room features. At 624, a source physical environment is determined. The source physical environment may be mapped in accordance with the discussion set forth above with respect to the scene mapping engine. The source environment may include the features of a physical environment including walls, doors windows, floor, etc. in varying levels of detail. Where a user is viewing and creating a configured environment using a see-through, mixed reality display device, real objects in the source physical environment may be viewed. Virtual objects may be added to the configured environment by any number of means, including the control interface 416 or other interfaces, and become part of the user's view (as in FIGS. 4b and 4c) of their environment. Additionally, virtual representations of other real objects in an environment may be included such as furniture, decorative features, and other elements. In one aspect, the source environment determines a mapping and location for virtual objects later placed in the configured environment. Virtual object placement in the configured environment is thus made relative to the source physical environment. At 626, the configured environment is associated with the rendering environment and/or rendering location and/or rendering user. In order to later access a configured environment, the configured environment can be accessed though one or more of where the environment is to be rendered (the rendering environment), the user, or the rendering location. Some configured environments may not be rendered in certain locations while others may depend on the rendering location based on the type of virtual objects provided in the environment. For example, a configured environment of a user's living room is associated to the source environment of the living room and may be further associated to rendering environments in the user's home. This "living room" configured environment may not be associated with the rendering environment of the user's office, and thus may blocked from being rendered in the rendering environment of the user's office.

At 630, the type of configured environment may be set as a location (physical environment) independent or location (physical environment) dependent environment. In one aspect, a location independent environment is one which can obscure a real environment in which it is rendered. A location dependent environment may be rendered relative to the physical environment in which the user is located, and therefore be locked to rendering in certain physical environments. At 632, user manipulation of virtual objects within an environment are monitored to determine which virtual objects are placed within an environment, where the objects are placed and how the objects relate to the real objects within the physical environment. At 634, the configured environment is stored for later rendering.

FIG. 7 is a flowchart illustrating one embodiment for performing step 606 of FIG. 6.

At 702, an initial determination is made as to whether or not the user is in a known location. Again, location can be determined based on whether or not the user is using geo location information or other location identifying information. If the user is in a known location, then a determination is made at step 710 as to whether configured environments associated with the location are available. If the location is not known at 702, then a determination as to whether or not a known physical environment surrounds the user at 704. If a known physical environment is found, then a determination is made as to whether or not configured environments are available and associated with the known physical location at 710. If no physical environment is known, a determination is made at 707 as to whether or not the user has associated with him or her location independent configured environments. Location independent configured environments can be associated with the user and be generated at the request of the user, or based on some other trigger, to render a configured environment in the field of view of the user. If such environments are available location independent configured environments may be loaded at step 708. If no configured environment is available and no location independent configured environments are available, then virtual objects are handled per the executing application on the processing unit 712. If configured environments are available, a determination is made at 714 as to whether or not public or shared environments are available. If a public environment is available at 714, user may be prompted to select at 716 whether they want to display a public shared environment. If the user does want a public environment, then a selection is made at 717. If the user does want a public or shared environment, then a public or shared environment may be loaded at 718. If no public environments are available, then a determination is made at 720 as to whether or not the user has their own configured environments. If a user has associated configured environments, a check is made to determine whether there are multiple environments available at 722. The environments may be location linked, source environment linked, rendering environment linked or location/environment independent. If multiple environments are not available, then a default environment associated with a user, source environment or rendering environment is loaded at 728. And if a selection is made at 724, then the selected environment is displayed at 727. If the user does not have configured environments at 720, then virtual objects in the executing application are handled per the application executing on the processing device or processing unit 4.

Figure 8:
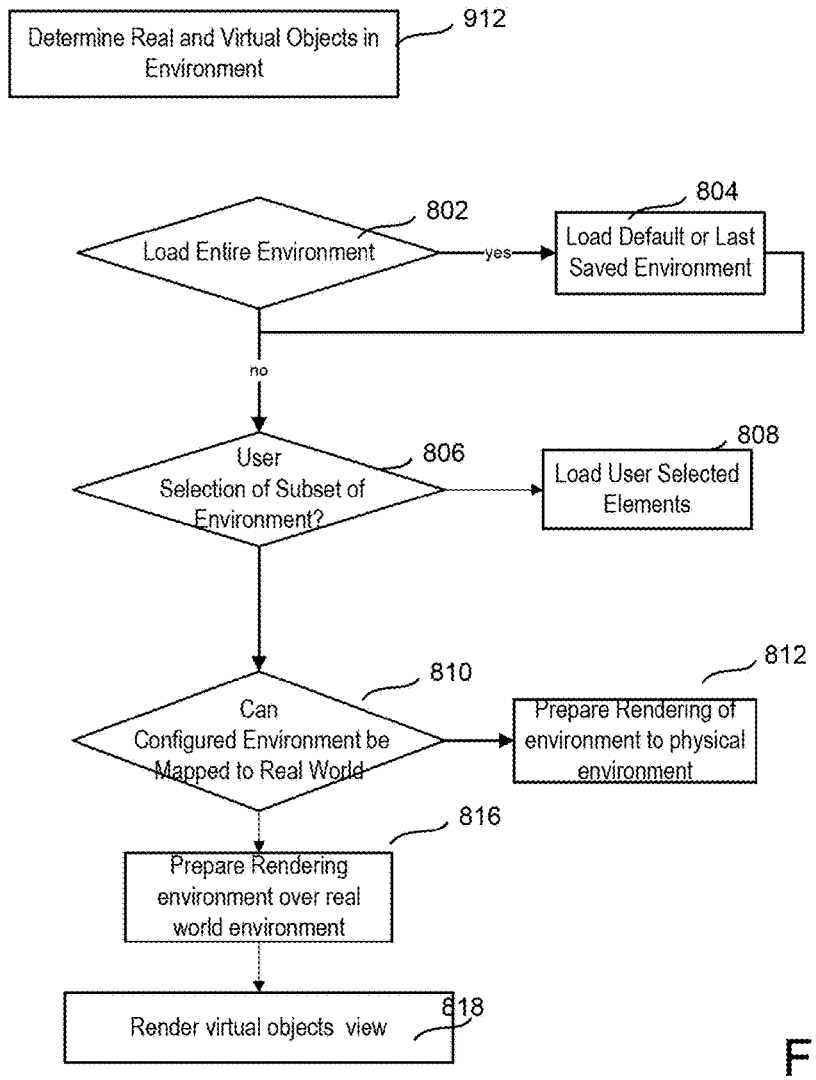
FIG. 8 is a flowchart illustrating a process for performing step 612 in accordance with FIG. 6.

FIG. 8 is a flowchart illustrating a process for performing step 612 in accordance with FIG. 6. At step 802, a determination is made as to whether or not one configured environment should be loaded in its entirety or partially. If a complete environment is to be loaded, then at 804, the default or last saved version of a configured environment is loaded. If a complete environment is not to be loaded, or after loading of a default or last saved environment, at 806, the user selects to load only a subset of the environment, only user selected items from the configured environment are loaded at 808. If a user selects a subset of elements, then the subset of elements are displayed in each field of view at 808. Once the elements are loaded, a determination is made at 810 as to whether or not the configured environment can be mapped to the real world environment. If so, then the environment is prepared for rendering in conjunction with the physical environment and the real objects in the physical environment at 812. If not, the environment is prepared to be loaded to obscure any conflicts with any physical elements in the user's real environment. Subsequent to the completion of steps 812 or 816, real objects are rendered at step 616 as illustrated in FIG. 6.

Figure 9:
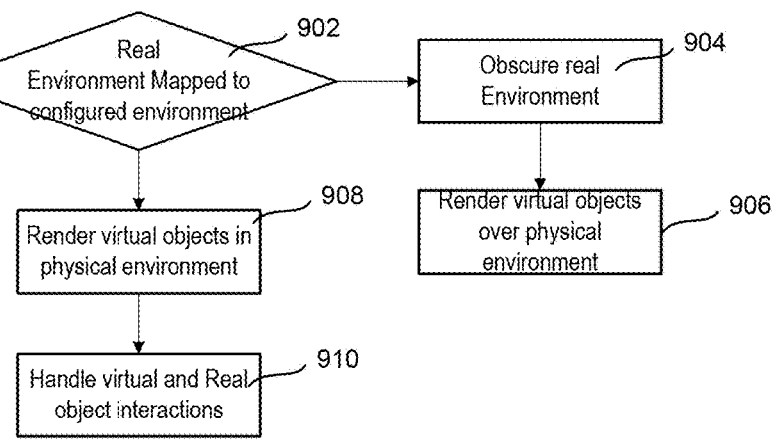
FIG. 9 is a flowchart illustrating one embodiment for performing step 618 in accordance with the present technology

FIG. 9 is a flowchart illustrating one embodiment for performing step 618 in accordance with the present technology. At 902, the physical environment is mapped to the configured environment. If the real environment may not be mapped to the configured environment, then at 904 the real environment is obscured and virtual objects are rendered over the physical environment at 906. If the real environment can be mapped to the configured environment then the virtual objects are rendered in the real physical environment at 908 and virtual and real object interactions are handled at step 910.

Figure 10:
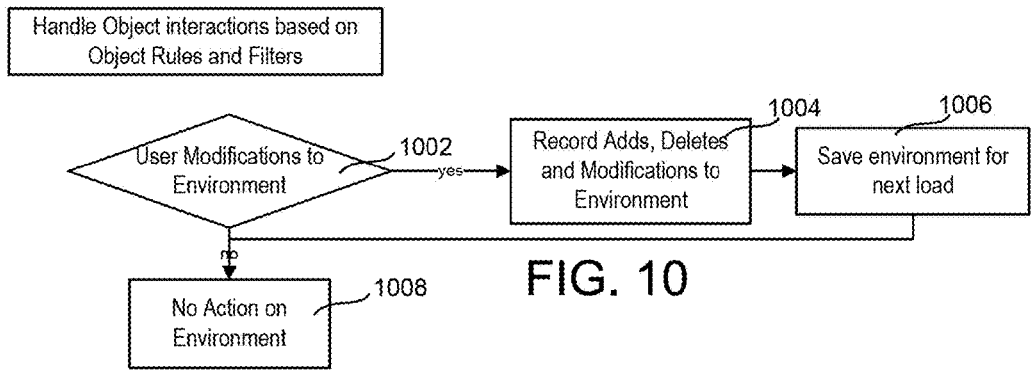
FIG. 10 is a flowchart illustrating one method for performing a step of handling interactions based on object rules and filters.

FIG. 10 is a flowchart illustrating one method for performing a step of handling interactions based on object rules and filters. At step 1002, a determination is made as to whether or not a user makes any modifications to the configured environment. If the user does, the user will record, add, delete or modify the environment at 1004 and the environment will be saved at 1006 for the next use of the configured environment. If no modifications are allowed or no modifications are made at 1008, then no action on any of the objects in the environment occurs at 1008.

Figure 11:
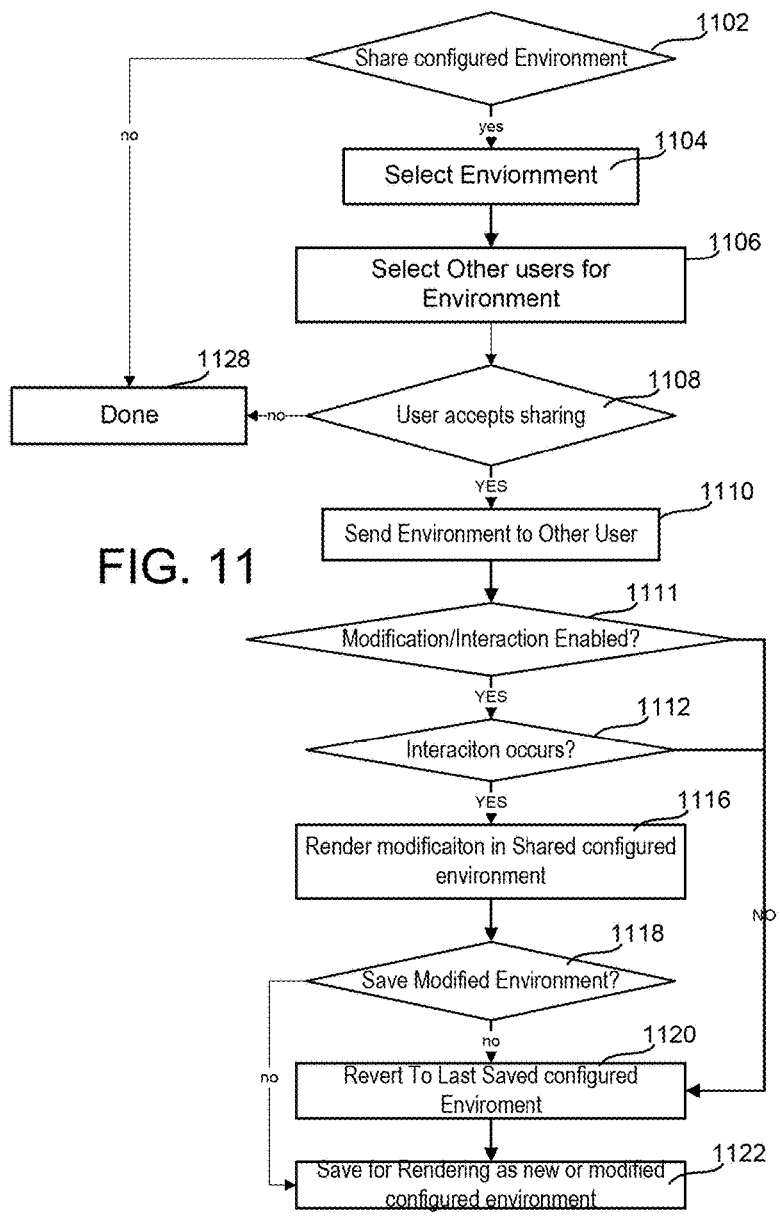
FIG. 11 is a flowchart illustrating a method for sharing virtual environments.
Figure 12B:
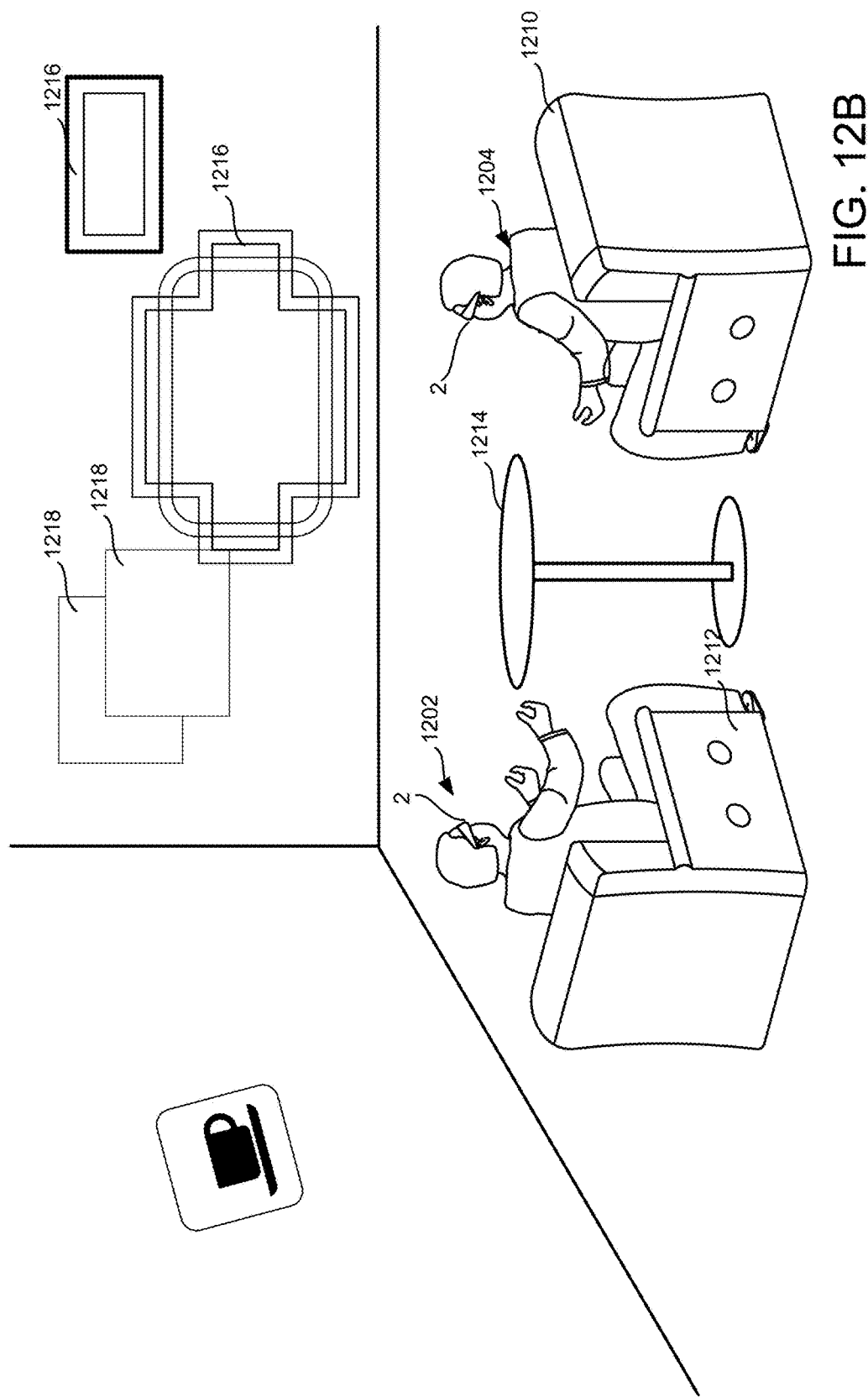

FIG. 11 is a flowchart illustrating a method for sharing virtual environments. FIG. 11 will be explained with reference to FIGS. 12A-12C which illustrate two users who may wish to share a virtual environment. In FIG. 12A two users 1202 and 1204 are sitting in a real world coffee shop. The table 1214 and chairs 1210 and 1212 are all real objects within the coffee shop environment 1250. A prompt 1208 appears only to the users asking the users whether or not they wish to see the configured environment for the coffee shop. Once the users select a view the configured environment, the configured environment shown in FIG. 12B is shown. This environment includes a variety of artwork 1218, 1216 painted on one of the walls of the environment. It should be understood that any number of different types of virtual objects may be provided in the configured environment of the coffee shop. FIG. 12C illustrates yet another embodiment wherein a user 1202 is sharing a private virtual environment with user 1204. In this case, the user 1202 has shared a virtual whiteboard with user 1204. In one embodiment, the whiteboard 1222 is projected on wall, while in another embodiment the whiteboard can completely obscure the wall.

FIG. 11 is a method for allowing users to share a custom version of a configured environment. At 1102, a determination is made as to whether or not a user wishes to share a configured environment with another user. If so, the user can select the environment 1104, and select which users the sharing user wishes to share the environment with at 1106. At 1108, the receiving user will be prompted to accept the sharing request from the sharing user. If the user accepts the request at 1108, then the environment is sent to the other user or shared with the other user at 1110. In this context, sending or sharing may comprise peer-to-peer sharing of environments via a communication link between respective user systems 10, or using the service 570 and user communication and sharing engine 574. Once shared, interactions between users relative to the shared configured environment can be tracked and stored for later retrieval as part of the configured environment. At 1111, a determination is made as to whether or not the sharing user allows the receiving users to modify the configured environment. If so, then at 1112 interaction may occur. If interaction occurs, then modifications to the shared configured environment are recorded at 1116 allowing the users to interact in the configured environment which is being shared. If no modifications are enabled and no interaction occurs, then the last saved configured environment will remain static from user to user at 1120. If changes to the configured environment may be saved by one or both users at 118, then at 1122, the configured environment is saved. At 1122, a new or customized version of the configured environment may be stored for later use.

Each of the processing environments, servers and or computers illustrated herein may be implemented by one or more of the processing devices illustrated in FIGS. 13-14.

FIG. 13 is a block diagram of an exemplary mobile device which may operate in embodiments of the technology described herein (e.g. processing unit 4). Exemplary electronic circuitry of a typical mobile phone is depicted. The device 1500 includes one or more microprocessors 1512, and memory 1510 (e.g., non-volatile memory such as ROM and volatile memory such as RAM) which stores processor-readable code which is executed by one or more processors of the control processor 1512 to implement the functionality described herein.

Mobile device 1500 may include, for example, processors 1512, memory 1550 including applications and non-volatile storage. The processor 1512 can implement communications, as well as any number of applications, including the interaction applications discussed herein. Memory 1550 can be any variety of memory storage media types, including non-volatile and volatile memory. A device operating system handles the different operations of the mobile device 1500 and may contain user interfaces for operations, such as placing and receiving phone calls, text messaging, checking voicemail, and the like. The applications 1530 can be any assortment of programs, such as a camera application for photos and/or videos, an address book, a calendar application, a media player, an Internet browser, games, other multimedia applications, an alarm application, other third party applications, the interaction application discussed herein, and the like. The non-volatile storage component 1540 in memory 1510 contains data such as web caches, music, photos, contact data, scheduling data, and other files.

The processor 1512 also communicates with RF transmit/receive circuitry 1506 which in turn is coupled to an antenna 1502, with an infrared transmitted/receiver 1508, with any additional communication channels 1560 like Wi-Fi or Bluetooth, and with a movement/orientation sensor 1514 such as an accelerometer. Accelerometers have been incorporated into mobile devices to enable such applications as intelligent user interfaces that let users input commands through gestures, indoor GPS functionality which calculates the movement and direction of the device after contact is broken with a GPS satellite, and to detect the orientation of the device and automatically change the display from portrait to landscape when the phone is rotated. An accelerometer can be provided, e.g., by a micro-electromechanical system (MEMS) which is a tiny mechanical device (of micrometer dimensions) built onto a semiconductor chip. Acceleration direction, as well as orientation, vibration and shock can be sensed. The processor 1512 further communicates with a ringer/vibrator 1516, a user interface keypad/screen, biometric sensor system 1518, a speaker 1520, a microphone 1522, a camera 1524, a light sensor 1526 and a temperature sensor 1528.

The processor 1512 controls transmission and reception of wireless signals. During a transmission mode, the processor 1512 provides a voice signal from microphone 1522, or other data signal, to the RF transmit/receive circuitry 1506. The transmit/receive circuitry 1506 transmits the signal to a remote station (e.g., a fixed station, operator, other cellular phones, etc.) for communication through the antenna 1502. The ringer/vibrator 1516 is used to signal an incoming call, text message, calendar reminder, alarm clock reminder, or other notification to the user. During a receiving mode, the transmit/receive circuitry 1506 receives a voice or other data signal from a remote station through the antenna 1502. A received voice signal is provided to the speaker 1520 while other received data signals are also processed appropriately.

Additionally, a physical connector 1588 can be used to connect the mobile device 1500 to an external power source, such as an AC adapter or powered docking station. The physical connector 1588 can also be used as a data connection to a computing device. The data connection allows for operations such as synchronizing mobile device data with the computing data on another device.

A GPS transceiver 1565 utilizing satellite-based radio navigation to relay the position of the user applications is enabled for such service.

The example computer systems illustrated in the Figures include examples of computer readable storage media. Computer readable storage media are also processor readable storage media. Such media may include volatile and non-volatile, removable and non-removable media implemented in any method or technology for storage of information such as computer readable instructions, data structures, program modules or other data. Computer storage media includes, but is not limited to, RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other medium which can be used to store the desired information and which can accessed by a computer.

FIG. 14 is a block diagram of one embodiment of a computing system that can be used to implement a network accessible computing system or a companion processing module. FIG. 14 is a block diagram of one embodiment of a computing system that can be used to implement one or more network accessible computing systems 12 or a processing unit 4 which may host at least some of the software components of computing environment depicted in FIG. 14. With reference to FIG. 14, an exemplary system includes a computing device, such as computing device 1700. In its most basic configuration, computing device 1700 typically includes one or more processing units 1702 including one or more central processing units (CPU) and one or more graphics processing units (GPU). Computing device 1700 also includes memory 1704. Depending on the exact configuration and type of computing device, memory 1704 may include volatile memory 1705 (such as RAM), non-volatile memory 1707 (such as ROM, flash memory, etc.) or some combination of the two. This most basic configuration is illustrated in FIG. 14 by dashed line 1706. Additionally, device 1700 may also have additional features/functionality. For example, device 1700 may also include additional storage (removable and/or non-removable) including, but not limited to, magnetic or optical disks or tape. Such additional storage is illustrated in FIG. 14 by removable storage 1708 and non-removable storage 1710.

Device 1700 may also contain communications connection(s) 1712 such as one or more network interfaces and transceivers that allow the device to communicate with other devices. Device 1700 may also have input device(s) 1714 such as keyboard, mouse, pen, voice input device, touch input device, etc. Output device(s) 1716 such as a display, speakers, printer, etc. may also be included. All these devices are well known in the art and are not discussed at length here.

The example computer systems illustrated in the figures include examples of computer readable storage devices. A computer readable storage device is also a processor readable storage device. Such devices may include volatile and nonvolatile, removable and non-removable memory devices implemented in any method or technology for storage of information such as computer readable instructions, data structures, program modules or other data. Some examples of processor or computer readable storage devices are RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other device which can be used to store the desired information and which can be accessed by a computer In one embodiment, the mixed reality display system 10 can be head mounted display device 2 (or other A/V apparatus) in communication with a local processing apparatus (e.g., processing unit 4 of FIG. 1A, or other suitable data processing device). One or more networks 50 can include wired and/or wireless networks, such as a LAN, WAN, WiFi, the Internet, an Intranet, cellular network etc. No specific type of network or communication means is required. In one embodiment, mixed reality object handling service 570 is implemented in a server coupled to a communication network, but can also be implemented in other types of computing devices (e.g., desktop computers, laptop computers, servers, mobile computing devices, tablet computers, mobile telephones, etc.). Mixed reality object handling service 570 can be implemented as one computing device or multiple computing devices. In one embodiment, service 570 is located locally on system 10.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of creating a customized virtual configured environment, comprising:
    scanning a source physical environment including one or more real world features of the source physical environment;
    creating an environment definition of the source physical environment;
    associating one or more virtual objects with the environment definition;
    defining one or more allowable rendering environments;
    storing the one or more virtual objects associated with the environment definition to allow rendering of the configured environment in the one or more allowable rendering environments, the configured environment associated with the source physical environment and with the one or more allowable rendering environments;
    determining a user presence in the one or more allowable rendering environments;
    presenting a selection to view the configured environment, the configured environment having been enabled prior to selection, the selection comprising one or more configured environments available to map to a respective one of the one or more allowable rendering environments based on the determined user presence, the allowable rendering environment having a physical environment with real objects; and
    rendering the configured environment upon receiving a user selection to view the configured environment at the one or more allowable rendering environments corresponding to the determined user presence such that the one or more virtual objects are rendered in the allowable rendering environment in a position relative to a corresponding one of the one or more real features in the source physical environment and blocking rendering of the configured environment when the one or more allowable rendering environments are not associated with the configured environment.

2. The method of claim 1 further including rendering a control interface for the configured environment.

3. The method of claim 2 wherein the control interface comprises a miniature three dimensional projection of the configured environment.

4. The method of claim 1 further including creating multiple sets of one or more virtual objects based on a source environment.

5. The method of claim 1 wherein the virtual objects include one or more virtual objects representing real objects found in the source environment.

6. The method of claim 5 wherein the one or more virtual objects include one or more virtual objects comprising projections of objects not based on real object in the source environment.

7. The method of claim 1 wherein the method includes providing multiple sets of one or more virtual objects associated with a rendering environment.

8. The method of claim 1 further including sharing the one or more virtual objects, the environment definition and the one or more allowable rendering environments.

9. A see-through head mounted display apparatus, comprising:
    a see-through, near-eye, augmented reality display;
    one or more processing devices in wireless communication with apparatus, the one or more processing devices operable to receive a definition of a location dependent configured environment, the definition of the location dependent configured environment based on a location of a physical source environment and including a selection of one or more virtual objects representing real objects in the physical source environment and configured for mapping to and rendering in an allowable rendering environment having a location dependent physical environment, the location dependent physical environment of the allowable rendering environment depending on a location of the configured environment;
    the one or more processing devices operable to render the one or more virtual objects and environment definition when in the allowable rendering environment, where the one or more processing devices determine the display is in the one or more allowable rendering environments, present a selection to view the configured environment; and render the configured environment upon receiving a user selection to view a rendered configured environment at the allowable rendering environment.

10. The apparatus of claim 9 wherein the one or more processing devices store multiple sets of one or more virtual objects in a memory of the apparatus.

11. The apparatus of claim 10 wherein the one or more processing devices store multiple sets of one or more virtual objects associated with a source environment.

12. The apparatus of claim 11 wherein the one or more processing devices store multiple sets of one or more virtual objects associated with a rendering environment.

13. The apparatus of claim 11 wherein the one or more processing devices share the one or more virtual objects, the environment definition and the allowable rendering environment.

14. The apparatus of claim 11 wherein the one or more processing devices monitor user interaction with the one or more virtual objects and environment and store a modified set of the one or more virtual objects and environment definition.

15. A method of rendering holographic virtual objects in a see through head mounted display system, comprising:
  determining a physical rendering environment including one or more real world features of the physical rendering environment;
  retrieving a configured virtual environment, the configured virtual environment including one or more virtual objects defined with respect to a physical, source environment and one or more allowable rendering environments, and including a source environment definition;
  determining the display system is in the one or more allowable rendering environments;
  presenting a selection to share a user selected subset including a partial amount of elements of the configured virtual environment in the display system, the configured virtual environment associated with the user of the display system; and
  rendering the configured virtual environment upon receiving a user selection to share a rendered configured virtual environment at the one or more allowable rendering environments when the display system is present in the one or more allowable rendering environments, and blocking rendering of the configured virtual environment when the one or more allowable rendering environments are not associated with the configured environment.

16. The method of claim 15 including retrieving a configured virtual environment from a plurality of stored configured environments.

17. The method of claim 15 including retrieving the shared configured environment.

18. The method of claim 15 wherein each configured environment is associated with a user, a source environment, a rendering environment or a location.

19. The method of claim 15 wherein the step of retrieving includes retrieving from a service providing a plurality of configured environments, each configured environment associated with a rendering environment.

20. The method of claim 15, wherein said rendering includes obscuring real objects in the rendering environment with one or more virtual objects in the configured environment when the configured virtual environment is unable to be mapped to the physical rendering environment.

* * * * *